(12) United States Patent  (10) Patent No.: US 7,890,856 B2
Chiang  (45) Date of Patent: Feb. 15, 2011

(54) SERVER SIDE WEB BROWSING AND MULTIPLE LENS SYSTEM, METHOD AND APPARATUS

(76) Inventor: Hiang Swee Chiang, 5405 83$^{rd}$ St., Elmhurst, NY (US) 11373

( * ) Notice: Subject to any disclaimer, the term of this patent is extended or adjusted under 35 U.S.C. 154(b) by 4 days.

(21) Appl. No.: 11/515,433

(22) Filed: Aug. 31, 2006

(65) Prior Publication Data

US 2007/0180367 A1  Aug. 2, 2007

Related U.S. Application Data

(62) Division of application No. 09/565,155, filed on May 3, 2000.

(51) Int. Cl.
*G06F 17/00* (2006.01)
(52) U.S. Cl. .................. 715/238; 715/200; 715/201; 715/234; 715/239; 715/243; 715/252; 715/273; 715/255; 709/203
(58) Field of Classification Search ......... 715/200–204, 715/209, 234–243, 251–255, 273; 709/203
See application file for complete search history.

(56) References Cited

U.S. PATENT DOCUMENTS

| 5,708,780 | A |   | 1/1998  | Levergood et al. |        |
|-----------|---|---|---------|------------------|--------|
| 5,801,699 | A |   | 9/1998  | Hocker et al.    | 715/837|
| 5,802,515 | A |   | 9/1998  | Adar et al.      | 707/5  |
| 5,805,153 | A | * | 9/1998  | Nielsen          | 725/37 |
| 5,845,299 | A | * | 12/1998 | Arora et al.     | 715/209|
| 5,890,172 | A |   | 3/1999  | Borman et al.    | 715/205|
| 5,897,644 | A | * | 4/1999  | Nielsen          | 715/210|

(Continued)

FOREIGN PATENT DOCUMENTS

WO  WO 2001/067304  9/2001

OTHER PUBLICATIONS

Business Wire, "Motorola Invests in Online Anywhere Author Once, View Anywhere Web Pages on Small Internet Devices." Published Oct. 19, 1998, pgs. 1-2.*

(Continued)

*Primary Examiner*—Stephen S. Hong
*Assistant Examiner*—David Faber
(74) *Attorney, Agent, or Firm*—Stolowitz Ford Cowger LLP

(57) ABSTRACT

A user may access a host server and receive display information within a single browser window. The display information includes at least one lens, wherein each lens controls server side web browsing and allows the user to view a separate web page from the Internet. The host server provides personalized web browsing capability specific to a particular user independent of the browser, device or location of the user. After the user submits a request to view a particular web page, the web page information is retrieved by the host server and transmitted to the user for display within a selected lens. Each lens controls server-side web browsing through independent navigational controls, such as a horizontal and vertical scroll bar, a resize button and the like. One lens may also control the web content displayed in another lens. The host server may reformat entire web pages so that they can be displayed within a lens without the need for scrolling. Additionally, each lens may have multiple cookies associated therewith. Users may further submit bookmarks which are applicable to one or more of the lenses. Bookmarks may be recognized through initiating a single command.

33 Claims, 22 Drawing Sheets

U.S. PATENT DOCUMENTS

| | | | | |
|---|---|---|---|---|
| 5,899,975 | A | * | 5/1999 | Nielsen .................. 704/270.1 |
| 5,911,145 | A | * | 6/1999 | Arora et al. ................. 715/207 |
| 5,918,010 | A | | 6/1999 | Appleman et al. .......... 709/203 |
| 5,918,080 | A | | 6/1999 | Yoshida |
| 5,918,237 | A | | 6/1999 | Montalbano ................ 715/234 |
| 5,923,326 | A | | 7/1999 | Bittinger et al. ............. 715/805 |
| 5,944,824 | A | | 8/1999 | He |
| 5,951,636 | A | | 9/1999 | Zerber ........................ 709/202 |
| 5,983,227 | A | | 11/1999 | Nazem et al. ................. 707/10 |
| 5,991,781 | A | * | 11/1999 | Nielsen ....................... 715/236 |
| 6,003,032 | A | | 12/1999 | Bunney et al. ................ 707/10 |
| 6,003,047 | A | | 12/1999 | Osmond et al. ............. 715/234 |
| 6,006,334 | A | | 12/1999 | Nguyen et al. |
| 6,011,537 | A | | 1/2000 | Slotznick .................... 715/733 |
| 6,016,494 | A | | 1/2000 | Isensee et al. ............... 707/102 |
| 6,023,714 | A | * | 2/2000 | Hill et al. .................... 715/235 |
| 6,025,844 | A | | 2/2000 | Parsons ...................... 715/805 |
| 6,028,603 | A | | 2/2000 | Wang et al. ................. 715/776 |
| 6,031,989 | A | | 2/2000 | Cordell ....................... 717/109 |
| 6,035,404 | A | | 3/2000 | Zhao |
| 6,041,357 | A | | 3/2000 | Kunzelman et al. |
| 6,041,360 | A | | 3/2000 | Himmel et al. |
| 6,092,196 | A | | 7/2000 | Reiche |
| 6,115,040 | A | | 9/2000 | Bladow et al. |
| 6,119,078 | A | | 9/2000 | Kobayakawa et al. .......... 704/3 |
| 6,141,758 | A | | 10/2000 | Benantar et al. |
| 6,151,622 | A | | 11/2000 | Fraenkel et al. ............. 709/205 |
| 6,163,778 | A | * | 12/2000 | Fogg et al. .................... 707/10 |
| 6,178,511 | B1 | | 1/2001 | Cohen et al. |
| 6,182,097 | B1 | | 1/2001 | Hansen et al. ............... 715/234 |
| 6,199,071 | B1 | * | 3/2001 | Nielsen ....................... 707/204 |
| 6,205,480 | B1 | | 3/2001 | Broadhurst et al. |
| 6,208,995 | B1 | | 3/2001 | Himmel et al. |
| 6,226,752 | B1 | | 5/2001 | Gupta et al. |
| 6,266,684 | B1 | | 7/2001 | Kraus et al. |
| 6,278,465 | B1 | * | 8/2001 | Nielsen ....................... 345/472 |
| 6,300,947 | B1 | * | 10/2001 | Kanevsky .................... 715/866 |
| 6,311,180 | B1 | | 10/2001 | Fogarty .......................... 707/4 |
| 6,339,437 | B1 | * | 1/2002 | Nielsen ....................... 715/787 |
| 6,374,359 | B1 | | 4/2002 | Shrader et al. |
| 6,412,008 | B1 | * | 6/2002 | Fields et al. ................. 709/228 |
| 6,438,578 | B1 | * | 8/2002 | Schmid et al. .............. 709/203 |
| 6,505,230 | B1 | | 1/2003 | Mohan et al. |
| 6,564,327 | B1 | | 5/2003 | Klensin et al. |
| 6,605,120 | B1 | * | 8/2003 | Fields et al. ................. 715/239 |
| 6,615,212 | B1 | * | 9/2003 | Dutta et al. .................... 707/10 |
| 6,615,237 | B1 | | 9/2003 | Kyne et al. |
| 6,629,246 | B1 | | 9/2003 | Gadi |
| 6,651,168 | B1 | | 11/2003 | Kao et al. |
| 6,665,842 | B2 | * | 12/2003 | Nielsen ....................... 715/269 |
| 6,668,322 | B1 | | 12/2003 | Wood et al. |
| 6,769,096 | B1 | | 7/2004 | Kuppusamy et al. |
| 6,832,355 | B1 | | 12/2004 | Duperrouzel et al. |
| 6,857,102 | B1 | * | 2/2005 | Bickmore et al. ........... 715/205 |
| 7,016,977 | B1 | * | 3/2006 | Dunsmoir et al. ........... 709/246 |
| 2001/0037359 | A1 | | 11/2001 | Mockette et al. ............ 709/203 |
| 2001/0047477 | A1 | | 11/2001 | Chiang |
| 2002/0010723 | A1 | * | 1/2002 | Nielsen ....................... 707/529 |
| 2002/0023111 | A1 | * | 2/2002 | Arora et al. .................. 707/513 |
| 2002/0054126 | A1 | | 5/2002 | Gamon |
| 2002/0054138 | A1 | | 5/2002 | Hennum |
| 2003/0005033 | A1 | | 1/2003 | Mohan et al. ............... 709/202 |
| 2004/0205594 | A1 | * | 10/2004 | Arora et al. .................. 715/513 |
| 2007/0118793 | A1 | * | 5/2007 | Arora et al. ............... 715/501.1 |
| 2007/0198914 | A1 | | 8/2007 | Chiang |
| 2007/0276903 | A1 | | 11/2007 | Chiang |
| 2008/0155012 | A1 | | 6/2008 | Chiang |

OTHER PUBLICATIONS

"This Domain Name Has Just Been Registered for One of Our Customers," www.broadpage.com, downloaded 2008, 1 page.
"Welcome to katiesoft.com," katiesoft.com, www.katiesoft.com, 2008, 1 page.
"Desktop Toolbar," Idealab, www.desktop.com, 2006, 1 page.
"Making you faster," Opera Software ASA., www.opera.com, 2008, 1-4.
"Related Searches," MDNH, Inc., www.mywcbos.com, 2008, 1 page.
"Slash cost and simplify," Cixtrix Systems, Inc., www.citrix.com, 1999-2008, 1 page.
International Search Report, dated May 21, 2001, 6 pages.
"New Internet Software Program Puts Users in Charge of What They Get From the Web," *Business Wire*, Oct. 25, 1999, 4 pages.
Stanek, W.R., "Essential HTML 4.0, Technology Information," *PC Magazine*, Oct. 20, 1999, 11 pages.
Turlington, "Sams Teach Yourself Netscape Communicator 4.5 in 24 Hours," 1998, Sams Publishing, p. 21-23, 36-40, 42-45, 57-58, 77, 86.
United States Patent and Trademark Office: Final Office Action, dated Feb. 13, 2009, U.S. Appl. No. 09/565,155, filed May 3, 2000, 29 pages.
United States Patent and Trademark Office: Final Office Action, dated Apr. 30, 2009, U.S. Appl. No. 11/515,461, filed Aug. 31, 2006, 34 pages.
United States Patent and Trademark Office: Final Office Action dated Apr. 8, 2005, U.S. Appl. No. 09/812,634, filed Mar. 20, 2011, 17 pages.
United States Patent and Trademark Office: Non-Final Office Action dated Dec. 20, 2005, U.S. Appl. No. 09/812,634, filed Mar. 20, 2001, 22 pages.
United States Patent and Trademark Office: Final Office Action dated May 31, 2006, U.S. Appl. No. 09/812,634, filed Mar. 20, 2001, 22 pages.
United States Patent and Trademark Office: Non-Final Office Action dated Oct. 28, 2008, U.S. Appl. No. 11/515,460, filed Aug. 31, 2006, 35 pages.
United States Patent and Trademark Office: Non-Final Office Action dated Aug. 4, 2008, U.S. Appl. No. 11/515,148, filed Aug. 31, 2006, 21 pages.
United States Patent and Trademark Office: Final Office Action dated Feb. 4, 2009, U.S. Appl. No. 11/515,148, filed Aug. 31, 2006, 25 pages.
United States Patent and Trademark Office: Non-Final Office Action dated Sep. 22, 2004, U.S. Appl. No. 09/565,155, filed May 3, 2000, 26 pages.
United States Patent and Trademark Office: Final Office Action dated Mar. 21, 2006, U.S. Appl. No. 09/565,155, filed May 3, 2000, 31 pages.
United States Patent and Trademark Office: Non-Final Action dated Sep. 8, 2006, U.S. Appl. No. 09/565,155, filed May 3, 2000, 43 pages.
United States Patent and Trademark Office: Final Office Action dated Apr. 5, 2007, U.S. Appl. No. 09/565,155, filed May 3, 2000, 36 pages.
United States Patent and Trademark Office: Non-Final Office Action dated Nov. 14, 2007, U.S. Appl. No. 09/565,155, filed May 3, 2000, 34 pages.
United States Patent and Trademark Office: Final Office Action dated Jun. 12, 2008, U.S. Appl. No. 09/565,155, filed May 3, 2000, 42 pages.
United States Patent and Trademark Office: Non-Final Office Action dated Oct. 24, 2008, U.S. Appl. No. 09/565,155, filed May 3, 2000, 48 pages.
United States Patent and Trademark Office: Non-Final Office Action dated Oct. 29, 2008, U.S. Appl. No. 11/515,461, filed Aug. 31, 2006, 43 pages.
United States Patent and Trademark Office: Final Office Action May 12, 2009, U.S. Appl. No. 11/515,460, filed Aug. 31, 2006, 39 pages.

United States Patent and Trademark Office: Non-Final Office Action dated Sep. 17, 2009, U.S. Appl. No. 11/515,461, filed Aug. 31, 2006, 32 total pages (*cover page + OA Summary* + pp. 2-31).

United States Patent and Trademark Office: Non-Final Office Action dated Sep. 28, 2009, U.S. Appl. No. 11/515,460, filed Aug. 31, 2006, 23 total pages (*cover page + OA Summary* + pp. 2-22).

United States Patent and Trademark Office: Non-Final Office Action dated Jul. 2, 2009, U.S. Appl. No. 11/515,148, filed Aug. 31, 2009, 15 total pages (*cover page + OA Summary* + pp. 2-14).

United States Patent and Trademark Office: Final Office Action dated Nov. 24, 2009, U.S. Appl. No. 11/515,148, filed Aug. 31, 2006, 16 total pages (*cover page + OA Summary* + pp. 2-15).

United States Patent and Trademark Office: Non-Final Office Action dated Aug. 24, 2004, U.S. Appl. No. 09/812,634, filed Mar. 20, 2001, 15 total pages (*cover page + OA Summary* + pp. 2-14).

United States Patent and Trademark Office: Non-Final Office Action dated Jul. 21, 2009, U.S. Appl. No. 09/565,155, filed May 3, 2000, 30 total pages (*cover page + OA Summary* + pp. 2-29).

United States Patent and Trademark Office: Non-Final Office Action dated Jan. 26, 2004, U.S. Appl. No. 09/565,155, filed May 3, 2000, 5 total pages (*cover page + OA Summary* + pp. 2-4).

Snell, N., "Sams Teach Yourself the Internet in 24 Hours, Third Edition," Jun. 17, 1999, Sams, Third Edition, pp. 91-92 + cover page (3 pages total).

U.S. Appl. No. 09/565,155, filed May 3, 2000, Chiang, 109 pages.

* cited by examiner

SERVER SIDE WEB BROWSING AND MULTIPLE LENS SYSTEM, METHOD AND APPARATUS

CROSS-REFERENCE TO RELATED APPLICATION

This application is a divisional of U.S. patent application Ser. No. 09/565,155, filed May 3, 2000, which claims priority from provisional U.S. patent application Ser. No. 60/187,434, entitled SERVER-SIDE WEB BROWSING AND MULTIPLE LENS SYSTEM, METHOD AND APPARATUS filed in the name of Hiang-Swee Chiang on Mar. 7, 2000, the entirety of which is incorporated by reference herein.

FIELD

A server-side web browsing and multiple lens system, method and apparatus directed to electronic document processing, and more particularly directed to structured electronic documents (e.g. HTML, XML) which present multiple web pages within a single browser window.

BACKGROUND

In general, computer application programs may be implemented in two ways. First, a user may load and execute a local application program. Local application programs have processing instructions that are stored in a memory of the same computing device from which the user executes commands. In order to receive upgrades to these applications, a user must download and install any new version of the software. Because such local applications are also computer specific, they also do not provide personalized web browsing capability specific to a particular user and independent of the browser, platform, machine and/or location of the user.

Remote applications are accessed and implemented by a user over a computer network, such as the Internet. Generally, a user may access a remote server and request that an application be activated. The remote server then transmits display data and processing instructions to the user's computing device over the network. Such "thin-client" devices, e.g., wireless and handheld devices, are limited by memory, screen size, processing and bandwidth constraints. In applications involving such devices, the commands must first be transmitted from the user's computing device to the remote server that runs the application. These applications are advantageous in that any upgrades to the software may be implemented by an operator of the server, rather than being downloaded and installed by each individual user.

One type of frequently-used application program is a web browsing application or "browser" which is generally used to view information on the Internet, such as pages of HTML data, graphical data (e.g. data presented in a GIF format, TIFF format or JPEG format), and multimedia presentations (e.g. data presented in MPEG formats). Most common web browsers present a single display area in which web page content is presented. Examples of such browsers include INTERNET EXPLORER 3.0 and NETSCAPE NAVIGATOR 4.0. The window in which the browser is active typically has navigational controls such as a horizontal scroll bar, a vertical scroll bar, a minimize command button, a maximize command button, a forward command button, a backward command button and a close window lens command button. Such controls are specific to the browser application in the displayed window and are typically implemented by the operating system (e.g. WINDOWS 95/98/NT/2000) rather than the browser itself.

Typically, users will visit more than one web page or web site in each browsing session, and will often want to return to and make comparisons with a previously-viewed page. Consequently, browsers with a single display area are troublesome in that a user must open multiple windows on their computing device if they wish to view more than one web page at a time. To view a previous page in such browsers, the user must repeatedly select a "back" button until the previously-viewed page is displayed. These limited features inhibit navigation on the Internet. Limited navigation ability is particularly pertinent to thin-client devices where memory, screen size, processing and bandwidth are constrained or limited.

Recently, several browsers have been introduced which provide separate display areas that allow viewing of more than one web page. One example of this type of browser is INTERNET EXPLORER 5.0 which allows a designated search page to be presented in a smaller display area of the window in which the browser is active. A larger display area is provided within the same window to view a current web page accessed by the user. However, INTERNET EXPLORER 5.0 does not provide separate navigational controls for the separate display areas within the window. Also, a user may not specify a web page other than a designated search page for presentation in the smaller display area.

A second example of a multiple-view web browser is the browser of BROADPAGE.COM. Each display area in the BROADPAGE.COM browser has independent navigational controls. However, the browser is a local application, not a remote application. Furthermore, multiple views are, presented in a tiled fashion rather than side-by-side, so that portions of previously viewed documents become partially obscured when selecting a new web page to view. The browser of KATIESOFT.COM is another example of a local application where the multiple views are presented in a non-overlapping manner.

In addition to the shortcomings presented above, current browsers suffer from other limitations in their functionality. For example, browsers typically include the ability to bookmark a web page that is being viewed. Bookmarking, as referred to herein, is the process by which a user designates that a web page identifier (e.g. a uniform resource locator (URL)) is to be stored within the browser so that, upon later selection of the stored address, the web page may be viewed. Currently, several steps must be taken to bookmark a web page after it is presented to the user. First, the user must typically activate a general bookmark command button. Next, the user must designate that the bookmark is to be added to a bookmark folder, and, perhaps, determine a location within the folder to which the bookmark information is to be stored. Finally, a confirmation of the bookmark must be entered. Thus, bookmarking has traditionally been a multi-step process.

Another disadvantage of common browser systems is that bookmarks are saved in the local computer device. Thus, they are not portable from one device to another.

Still another disadvantage of common browsers is that they generally do not allow the entire content of a web page to be viewed at once. Many web pages contain content, the size or length of which may exceed the display area of a browser window. Typically, browsers rely on the scroll bar functions provided by the operating system to allow a user to scroll through the web site content. The ability to reformat a web page so that its entire content can be viewed within the display area of a window without scrolling has not been possible in earlier browsing systems. The need for reformatting web pages is particularly pertinent to thin-client devices with limited screen displays.

SUMMARY

The above-identified problems are solved and a technical advance is achieved by a server side web browsing and multiple lens system, method and apparatus. One advantage of the system, method and apparatus is that a host server presents centralized memory and processing to facilitate communications with thin-client devices.

Another advantage of the host server is to present multiple web page information to a user through server-side programming, which facilitates web page persistence across session, browser, device and location, i.e., the host server provides personalized web browsing capability specific to a particular user independent of the browser, platform, device and/or location of the user.

Yet another advantage of the host server is that it enables translations on the fly from one protocol received from a third party server to another protocol for display to a user on a remote device. For example, the remote server can reformat web content received from a third party server so that it can be displayed within the display area of a user's device. Consequently, a user may view the entire contents of a reformatted web page within the display area of a single lens or browser window, i.e., a miniaturized full view screen in lieu of using a horizontal or vertical scroll bar. The host server can further translate any input language (e.g., HTML, CSS, XML, XSL, XHTML, WML) to any output language (e.g., HTML, WML) for display to a particular use.

Still another advantage of the host server is that it provides a centralized memory to store bookmarks and cookies so that they are portable from one device to another device. It is a further advantage of the system, method and apparatus that a user may bookmark a web page or a plurality of web pages with a single command and store it.

It is yet another advantage of the system, method and apparatus that each lens may have multiple cookies associated therewith. Alternatively, a cookie may be stored so that it is associated with a particular user regardless of the browser, platform, device and/or location of the user. Storing cookies on the server-side allows an unlimited number and size of cookies to be stored per user or lens. The server-side storage capacity for such cookies is particularly pertinent to thin-client devices which have limited storage capacity.

Still another advantage of the system, method and apparatus is that a user may simultaneously view and interact with a plurality of web pages within a single browser window through one or more lenses wherein each lens controls server-side web browsing through an independent and full range of navigational controls, i.e., full browser control capability.

An advantage of the server-side browsing capability of the system, method and apparatus is that it enables multiple browsers for thin-client devices limited by memory, screen size, processing and bandwidth constraints.

Yet another advantage of the system, method and apparatus is that one lens can control the web content displayed in another lens. For example, one lens can be used to conduct a search and the results of the search can be displayed in another lens.

In one embodiment, the system, method and apparatus presents web content to a user at a remote device. According to the embodiment, a host server transmits display information to the user comprising at least one lens for presentation within a window of a browser on the user's device. Any number of lenses can be used in the system, method and apparatus. In alternative embodiments, the number of lenses are two, four or a plurality of lenses.

Each lens controls server-side web browsing and is operative to display a separate web page upon receiving a uniform resource locator or other web identifier (collectively "URL") from the user. Each lens controls server-side browsing through any number and type of navigational controls such as a uniform resource locator entry field, a horizontal scroll bar, a vertical scroll bar, a minimize command button, a maximize command button, a close lens command button, a forward command button, a backward command button, a bookmark command button, a reformat command button or a menu command button. In another embodiment, a lens may have a full range of navigational controls, i.e., full browser control capability. In still another embodiment, one lens may control the web content displayed in another lens.

In other embodiments, the host server may receive an identifier from a user, verify the identifier and transmit display information to the user, such that the user has web page persistence across session, platform, browser, device and location. The host server may also store at least one cookie associated with each lens or with a user's identifier. The host server may further receive a single bookmark command to bookmark a web page presented to a user and store a bookmark identifier corresponding to the web page.

In still another embodiment, the host server translates any protocol received by a third party server to a second protocol to be presented to a user on a remote device. The server receives from a third party server web page display data in a first language, such as hypertext markup language (HTML), cascading style sheet language (CSS), extensible markup language (XML), extensible stylesheet language (XSL), extensible hypertext markup language (XHTNL) or wireless markup language (WML) and translates the data into a second language, such as HTML or WML, for presentation on the remote device.

In yet another embodiment, the web page display data received by the host server from a third party server is reformatted by the host server so that substantially all of the display data can be displayed within the display area of the lens or window on the remote device. The server determines the size of the display area of the lens or window of a remote device. If the size of the display data is greater than the size of the display area, the server reformats the display data so that it can be presented with the display area of the lens. The server can reformat the size of the display data to be substantially equal to the size of the display area. Alternatively, if the size of the display data is less than the size of the display area, the server can reformat the size of the display data to be substantially equal to the size of the display area.

In still another embodiment, a user transmits a request to the server to reformat a web page. In response to the request, the host server reformats the web page so that substantially all of the display data is displayed within the display area of the user's lens or window, such that the user does not have to use a horizontal or vertical scroll bar to view the data. In an alternative embodiment, the web page can be reformatted by the server to any percentage of its original size selected by the user.

It is not intended that the server-side web browsing and multiple lens system, method and apparatus be summarized here in its entirety. For example, the system, method and apparatus is also directed to a remote device for receiving display information from the host server, including at least one lens present within a window of a browser on the remote device, wherein each lens controls server-side web browsing.

The system, method and apparatus is further directed to a computer readable medium having computer executable software code stored thereon for presenting, through a host server, web content to a user at a remote terminal and for receiving web content at a remote device. Further features, aspects and advantages of the system, method and apparatus are set forth in or are apparent from the following brief and detailed descriptions and drawings and claims which follow.

BRIEF DESCRIPTION OF THE DRAWINGS

Further aspects of the server-side web browsing and multiple lens, system, method and apparatus will be more readily appreciated upon review of the detailed description set forth below when taken in conjunction with the accompanying drawings, of which.

It will be understood that the foregoing brief description and the following detailed description are exemplary and explanatory of this invention, but are not intended to be restrictive thereof or limiting of the advantages which can be achieved by this invention. Thus, the accompanying drawings, referred to herein and constituting a part hereof, illustrate embodiments of this invention and, together with the detailed description, serve to explain the principles of this invention.

DETAILED DESCRIPTION

Figure 1:
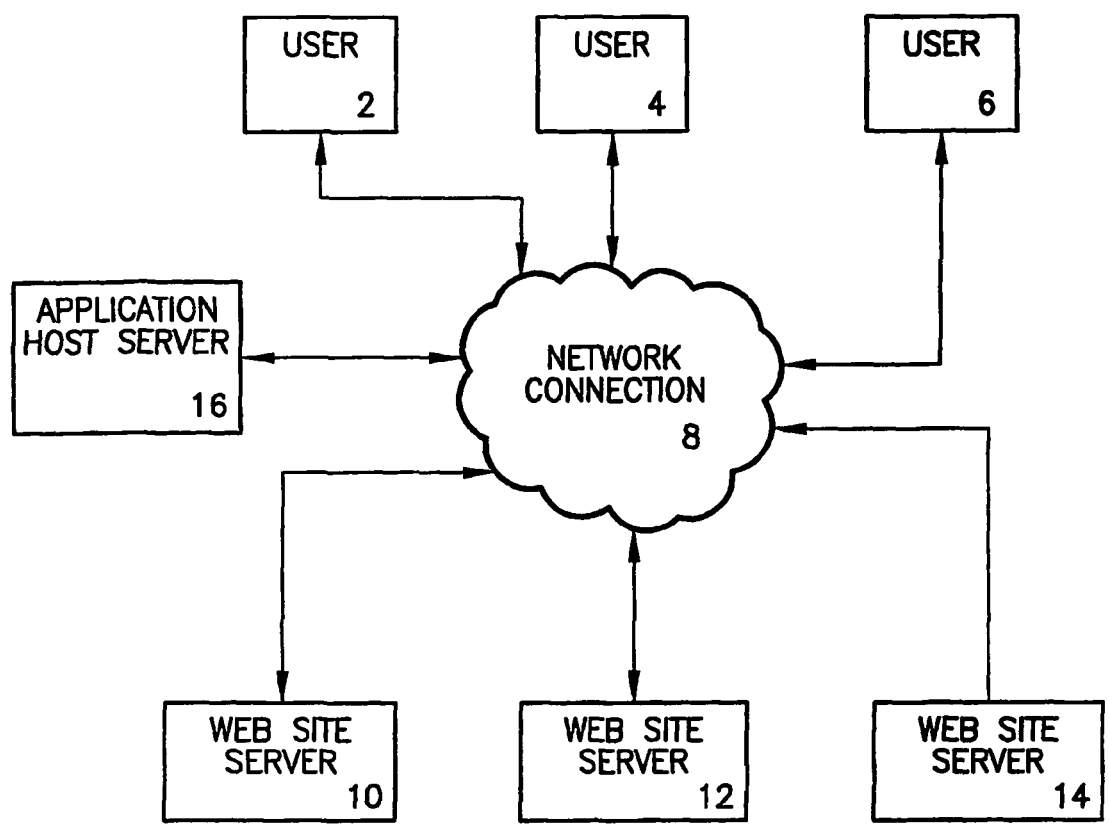
FIG. 1 is a block diagram illustrating an exemplary computer network including the application host server.

Referring now to FIG. 1, in general, the server-side web browsing and multiple lens system, method and apparatus allows a user at a remote device 2 to access an application host server 16 which implements multiple lens displays. The server 16 generates appropriate display data and transmits the same to the user for display within a single window of a local web browsing application. The display data formats the window to present at least one lens. The display data can be customized 15 for each user to present data through as many lenses as suits a user's needs, e.g., two, three, four, five, six or more lenses can be presented. The lenses can also be formatted in any shape or orientation.

Each lens controls server-side web browsing through independent navigational controls. The controls allow a user to, inter alia: (i) select a web page URL to be displayed; (ii) navigate backward and forward through a viewing history of web pages; (iii) scroll up or down or from side to side; (iv) maximize or minimize selected web pages; and (v) bookmark a web page with a single command. Such server-side browsing is accomplished by a server which presents command buttons or text entry fields having embedded commands associated therewith. The embedded commands generally take the form of:

http://<server>:<port/<multiple lens system>/?
   JLMClick=<ommand>[&<attribute name>=<attribute value> . . . ]

where:

| | |
|---|---|
| server = | the host name of the server running the multiple lens system; |
| port = | the port number on which the multiple lens system receives commands; |
| multiple lens system = | The resource name of the multiple lens system; |
| command = | the different commands for various lens operations described below; |
| attribute name = | the argument name of a specific command; and |
| Attribute value = | the argument value of a specific command |

The commands used to implement the server-side web browsing and multiple lens system generally include the following:

| NAME: | ATTRIBUTE: | ACTION: |
|---|---|---|
| JLSShowCurrentDesktop | None | Instructs the server to show the current web pages within a single window. The server keeps a copy of the web page identifiers so that in the event of a network interruption or user sign-out, the same display of web pages will persist across sessions. |
| JLSShowTile | JLVRows, JLVColumns | Tiles all lenses into JLVRows and JLVColumns. If one or both attributes are not specified, current row and column values are taken from the operating system of the user's device values. |
| JLSShowRow | JLVRow | Shows all lenses on a horizontal row of the window. JLVRow contains the row number starting from, i.e. 1 at the top of the window. |
| JLSShowLens | JLVLens, JLVType | Shows a lens. JLVLens specifies the coordinates of the lens where, i.e. 11 may designate the top left position, i.e., 12 the top right position, i.e., 21 the bottom left position and, |

-continued

| NAME: | ATTRIBUTE: | ACTION: |
|---|---|---|
| | | i.e., 22 the bottom right position. JLVType specifies how to show the lens (e.g. minimized or maximized). |
| JLSShowTitle | JLVLens, JLVType | Shows the title bar of a web page displayed in a lens. |
| JLSShowCurrentView | JLVLens | Shows the current view of a lens. |
| JLSShowPreviousView | JLVLens | Shows the previous view of a lens. |
| JLS ShowNextView | JLVLens | Shows the next view of a lens. |
| JLSShowSystemMenu | JLVLens | Shows menu web page in a lens. |
| JLSAddLens | JLVTitleText, JLVIcon | Adds a lens to the window. |
| JLSRemoveLens | JLVLens | Removes a lens from the window. |
| JLSGetLenses | None | Retrieves the number of lenses displayed in the window. |
| JLSGetRows | None | Retrieves the number of rows in the window. |
| JLSGetColumns | None | Retrieves the number of columns in the window. |
| JLSGetTitleText | JLVLens | Retrieves the title text of a lens. |
| JLSGetIcon | JLVLens | Retrieves the icon of a lens. |
| JLSSetRows | None | Sets the number of rows in the window. |
| JLSSetColumns | None | Sets the number of columns in the window. |
| JLSSetTitleText | JLVLens | Sets the title text of a lens. |
| JLSSetIcon | JLVLens | Sets the icon of a lens. |

The commands may implement programming scripts, such as may be generated in JAVASCRIPT, to perform the corresponding action. In response to these commands, the server 16 generates output in a suitable browser-compatible language such as HTML. The output includes use of FRAME or IFRAME commands to generate a multiple lens display. For each new command received from the user, the output is regenerated and re-transmitted by the server 16 for display on the user device 2. The output may be further updated if a selected web page in the display transmits refresh information or new data.

In an example of the use of these commands, a server 16 may authenticate a user who is accessing the multiple lens system. After authentication, the user, through the local web browser, transmits to the server 16 a redirection command including the JLSShowCurrentDesktop command. The server 16 may reply to the command by, for example, outputting HTML framing commands which set title bars, status bars, display areas and borders for all the lenses to be displayed in a window controlled by the local browser. When the user wants to change the layout of the window or when the user adds or removes lenses from the window, the local browser transmits a JLSShowTile command to the server 16 which in turn will tile all the lenses according to current row and column parameters.

Turning again to FIG. 1, there is depicted an exemplary computer network arrangement through which a plurality of remote devices 2, 4, 6 may communicate with server 16 and a plurality of third-party servers 10, 12, 14 via network connection 8 in any known manner. Computer network connection 8 can be an Internet-based network such as the World Wide Web. It may also be any one or more of a local area network (LAN), a wide-area network (WAN), an intranet environment, an extranet environment, a wireless network or any other type of computer network, such as those enabled over public switched telephone networks.

Remote devices 2, 4, 6 may each be any type of computing device, such as a personal computer, a workstation, a network terminal, a hand-held remote access device, a personal digital assistant (PDA) or any other device, including wireless devices, that can accomplish two-way electronic communication over the network connection 8. Specific functions and operations of user devices 2-6, third-party web site servers 10, 12, 14 and application host server 16 are discussed further below.

Figure 2:
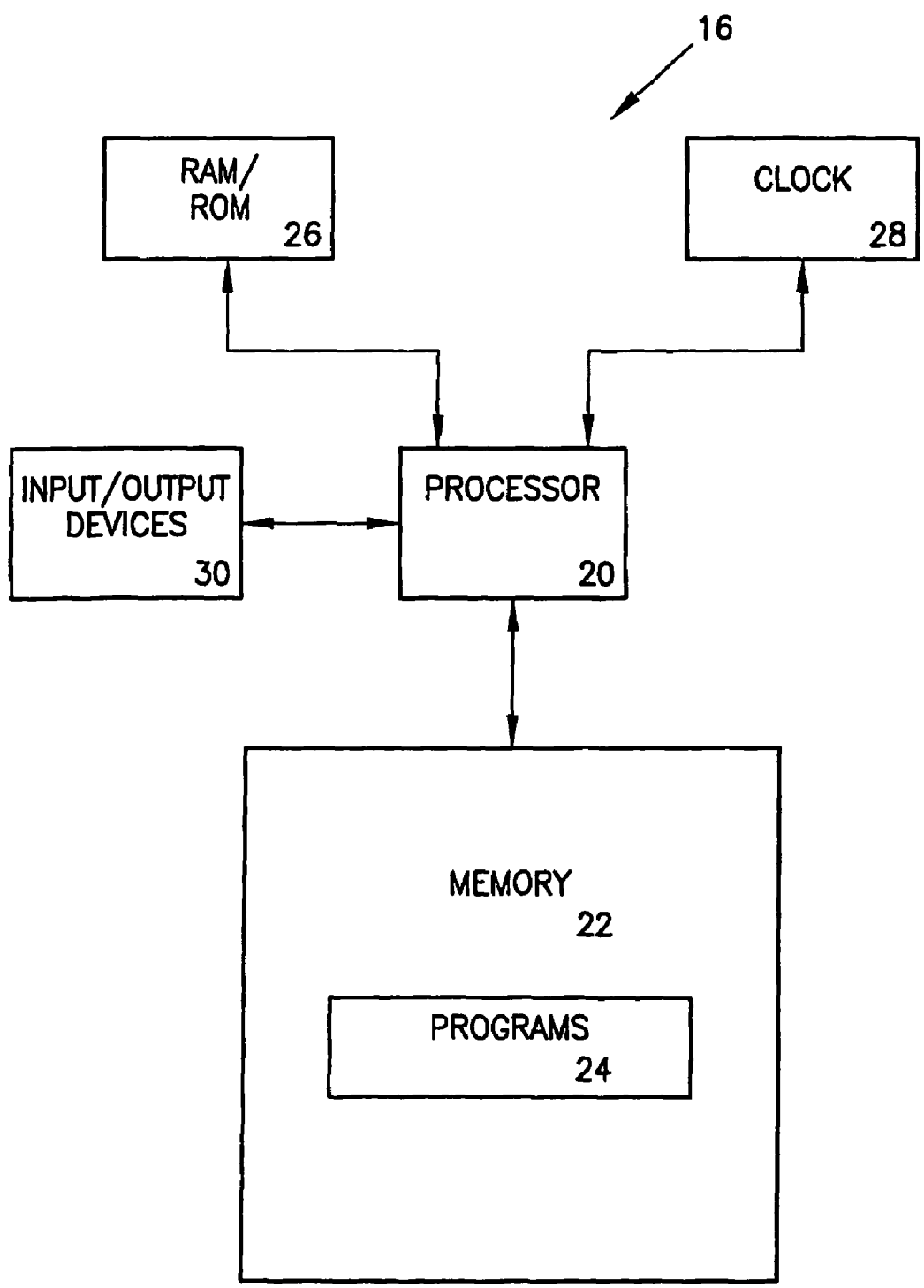
FIG. 2 is a block diagram of exemplary components of an application host server for use with the system of FIG. 1.
Figure 3:
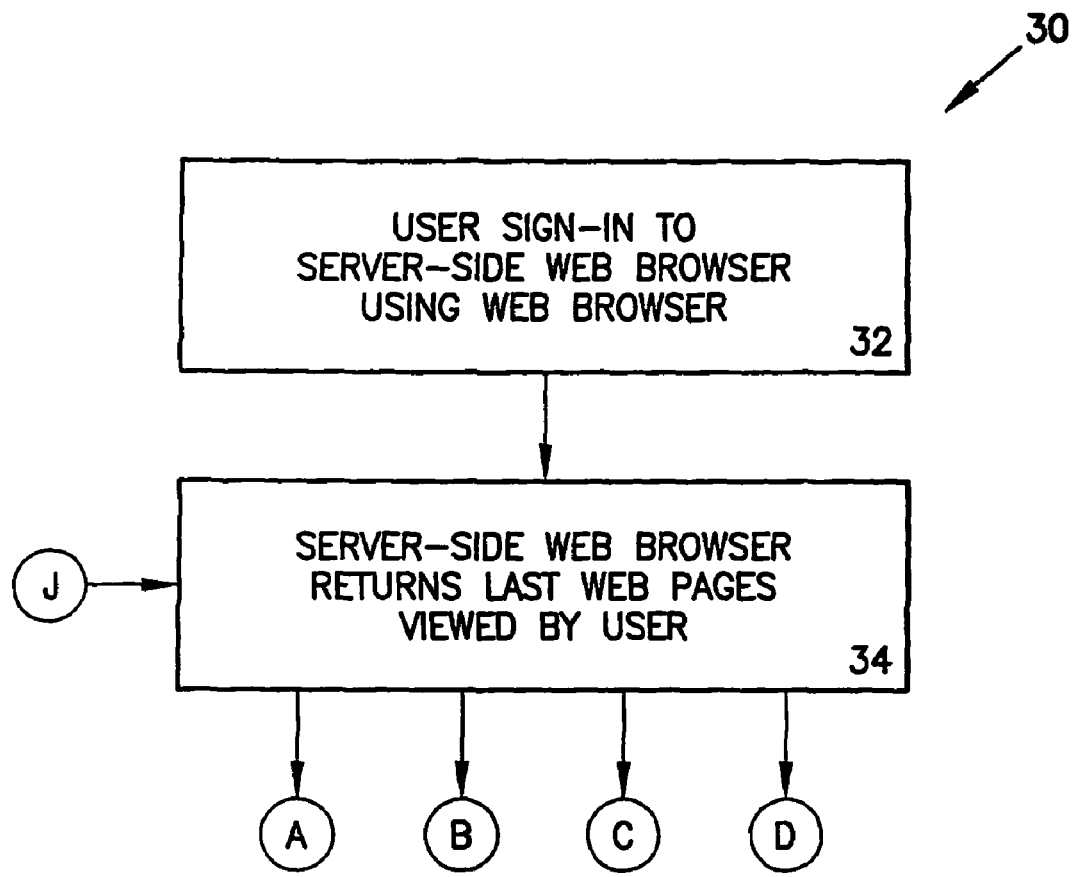
FIGS. 3-12 are a flowchart of an exemplary process by which a user may simultaneously view and bookmark a plurality of web pages.
Figure 4:
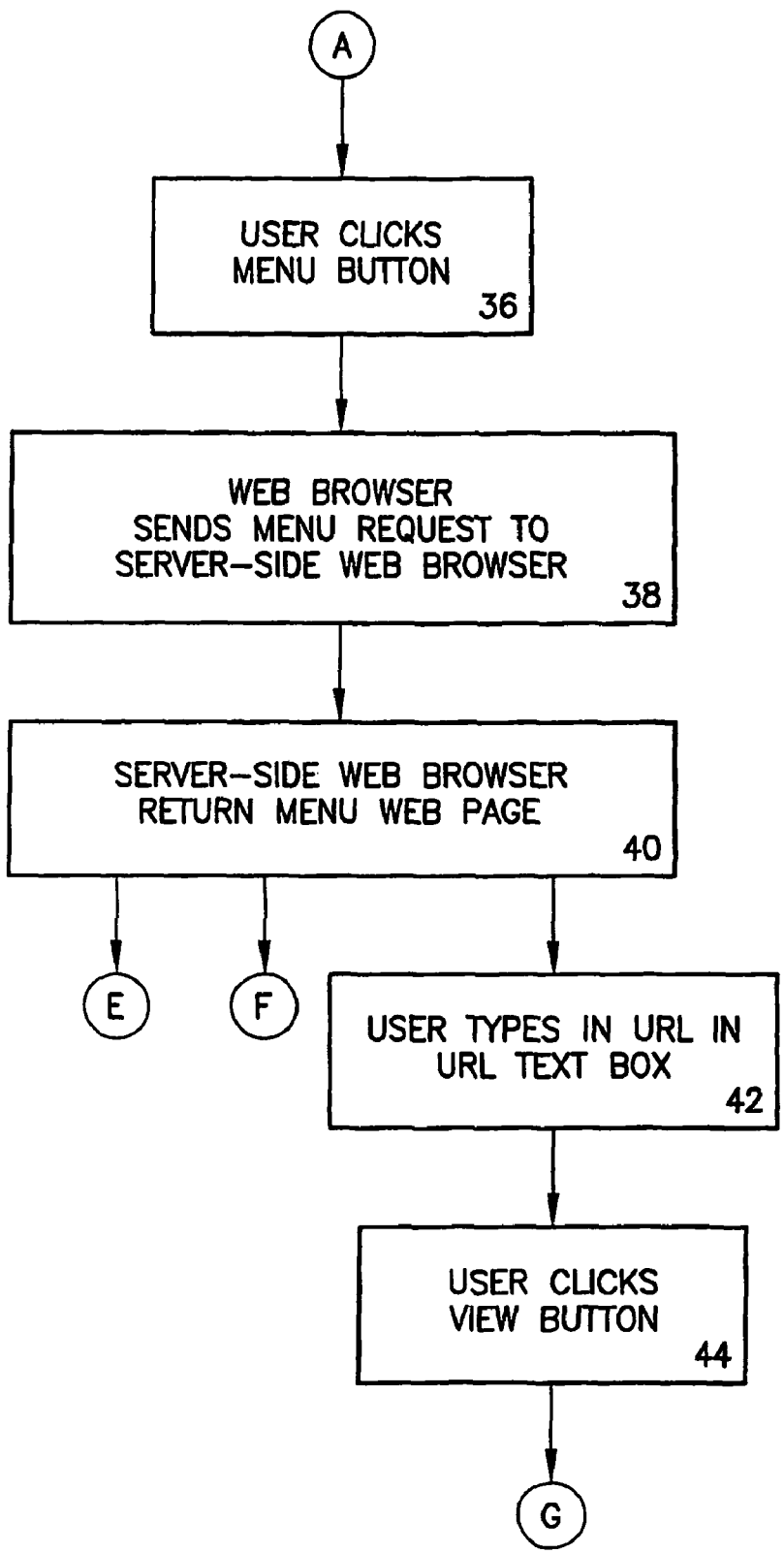
Figure 5:
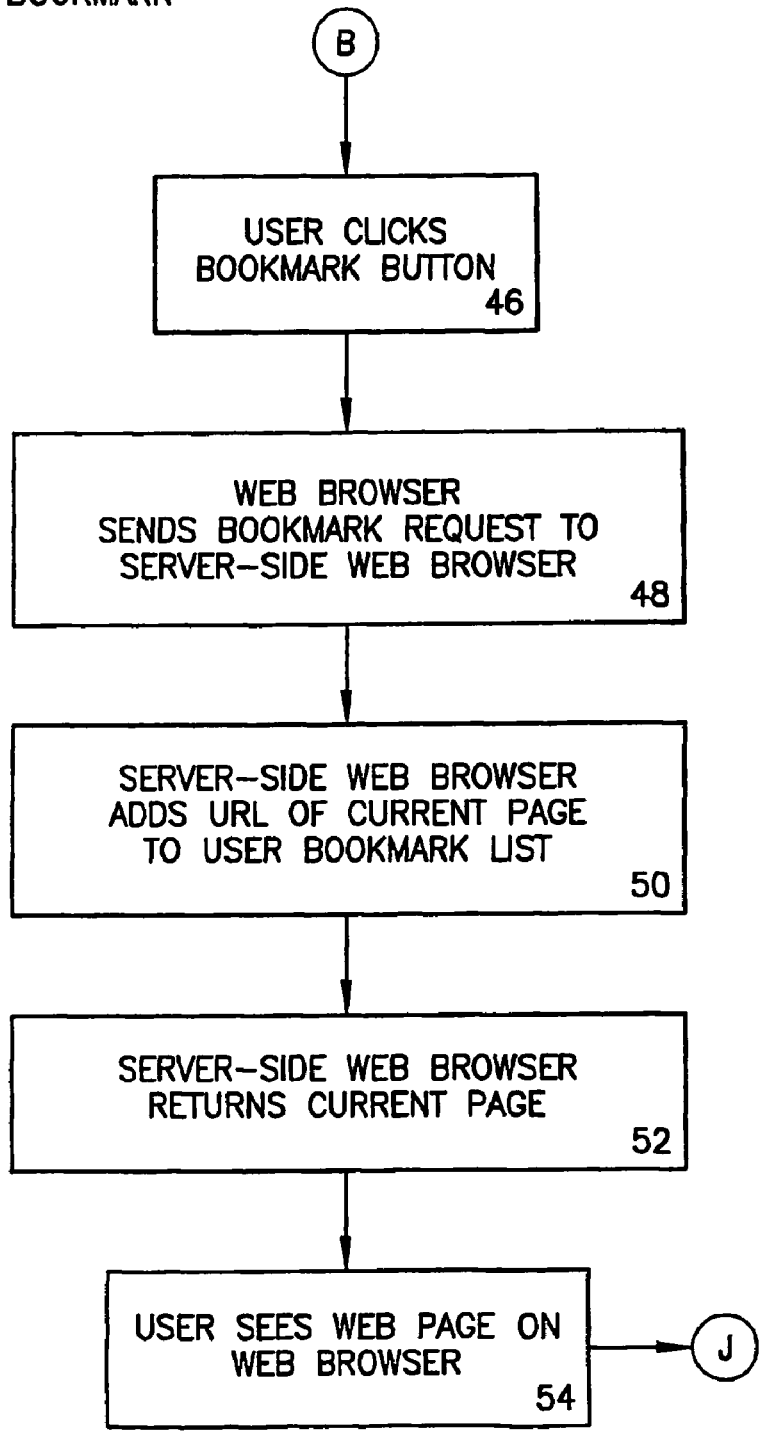

Turning now to FIG. 2, displayed therein are exemplary components of a computing device, such as server 16. Any of user remote devices 2, 4 and 6 or third-party web site servers 10, 12, 14 may share a similar configuration as follows. The primary component of server 16 is processor 20, which may be any commonly available microprocessor, such as the PENTIUM III manufactured by INTEL CORP. The processor 20 may be operatively connected to further exemplary components, such as RAM/ROM 26, a clock 28, input/output devices 30, and a memory 22 which, in turn, stores one or more computer programs 24.

Processor 20 operates in conjunction with random access memory and read-only memory. The random-access memory (RAM) portion of RAM/ROM 26 may be a suitable number of Single In-line Memory Module (SIM) chips having a storage capacity (typically measured in kilobytes or megabytes) sufficient to store and transfer, inter alia, processing instructions utilized by processor 20 which may be received from application programs 24. The read-only memory (ROM) portion of RAM/ROM 26 may be any permanent non-rewritable memory medium capable of storing and transferring, inter alia, processing instructions performed by processor 20 during a start-up routine of server 16.

Clock 28 may be an on-board component of processor 20 which dictates a clock speed (typically measured in MHz) at which processor 20 performs and synchronizes, inter alia, communication between the internal components of server 16.

Input/output device(s) 30 may be one or more known devices used for receiving operator inputs, network data, and the like and transmitting outputs resulting therefrom. Accordingly, exemplary input devices may include a keyboard, a mouse, a voice recognition unit and the like for receiving operator inputs. Output devices may include any known devices used to present data to an operator of the server 16 or to transmit data over the computer network connection 8 to a remote user or customer. Accordingly, suitable output devices may include a display, a printer and a voice synthesizer connected to a speaker.

Other input/output devices 30 may include a telephonic or network connection device, such as a telephone modem, a cable modem, a T-1 connection, a digital subscriber line or a network card, for communicating data to and from other computer devices over computer network connection 8, such as remote device 2. In an embodiment involving a network server, communications devices used as input/output devices 30 can have capacity to handle high bandwidth traffic in order to accommodate communications with a large number of users 2-6.

Memory 22 may be an internal or external large capacity device for storing computer processing instructions, computer-readable data, and the like. The storage capacity of the memory 22 is typically measured in megabytes or gigabytes.

Accordingly, memory 22 may be one or more of the following: a floppy disk in conjunction with a floppy disk drive, a hard disk drive, a CD-ROM disk and reader/writer, a DVD disk and reader/writer, a ZIP disk and a ZIP drive of the type manufactured by IOMEGA CORP., and/or any other computer readable medium that may be encoded with processing instructions in a read-only or read-write format. Further functions of and available devices for memory 22 will be apparent.

Memory 22 may store, inter alia, a plurality of programs 24 which may be any one or more of an operating system such as WIDOWS 2000 by MICROSOFT CORP., and one or more application programs, such as a web hosting program. The programs 24 may include processing instructions for accomplishing a server-side web browsing system as described herein.

Figure 16:
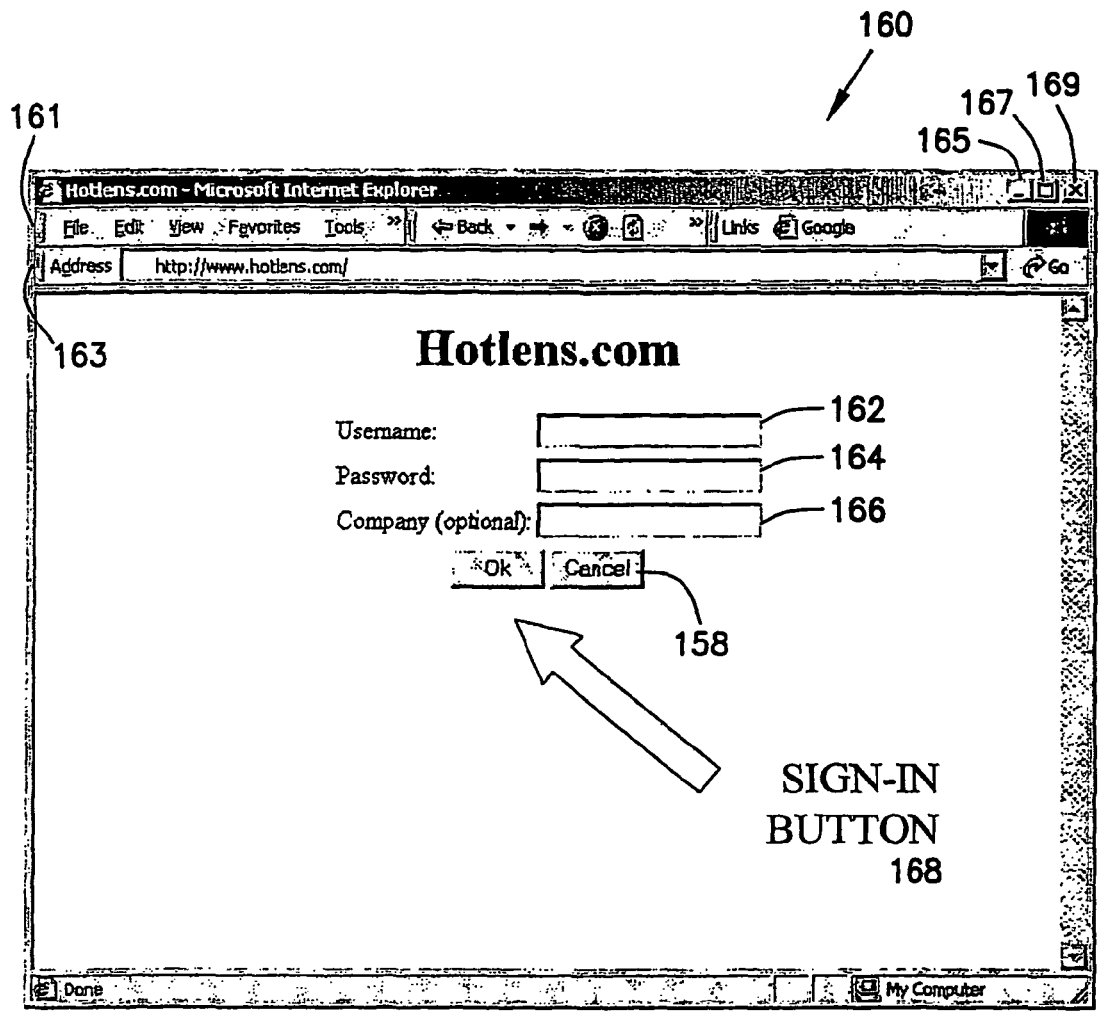
FIG. 16 is an exemplary screen display depicting a user log-in page.

Turning now to FIGS. 3-12, therein is depicted an exemplary process 30 by which a user may simultaneously view a plurality of web pages. The process 30 may begin after a user at a remote device 2 selects the URL of an application host server 16 which offers a server-side, multiple lens, browsing application. As shown in FIG. 16, the URL for the host server 16 may be entered in the URL entry field 163 of the browser residing on the user's device 2. An exemplary sign-in window 160, such as the one presented in FIG. 16, may than be presented to the user. Window 160 can have menu and resize controls which are defined by the operating system residing on the user's device 2. Such menu and re-size controls may include a menu bar 161, a minimize command button 165, a maximize command button 167 and a close window command button 169. The window 160 may furthermore offer navigational controls such as URL entry field 163.

In order to complete the sign-in, the user may enter a user name or other unique identifier into user name field 162 and may further enter a password into password field 164 (step 32). An optional field such as company field 166 may be provided for those users that subscribe to the server 16 through a group affiliation, such as a corporation. Upon entering the field information into field 162, 164 and 166, the user may transmit such information to the remote server by selecting the sign-in button 168 with a pointing device, such as a mouse. If the information has been entered incorrectly or if the user decides not to log into the server 16, the user may select the cancel command button 158 to abort the sign-in.

Figure 18:
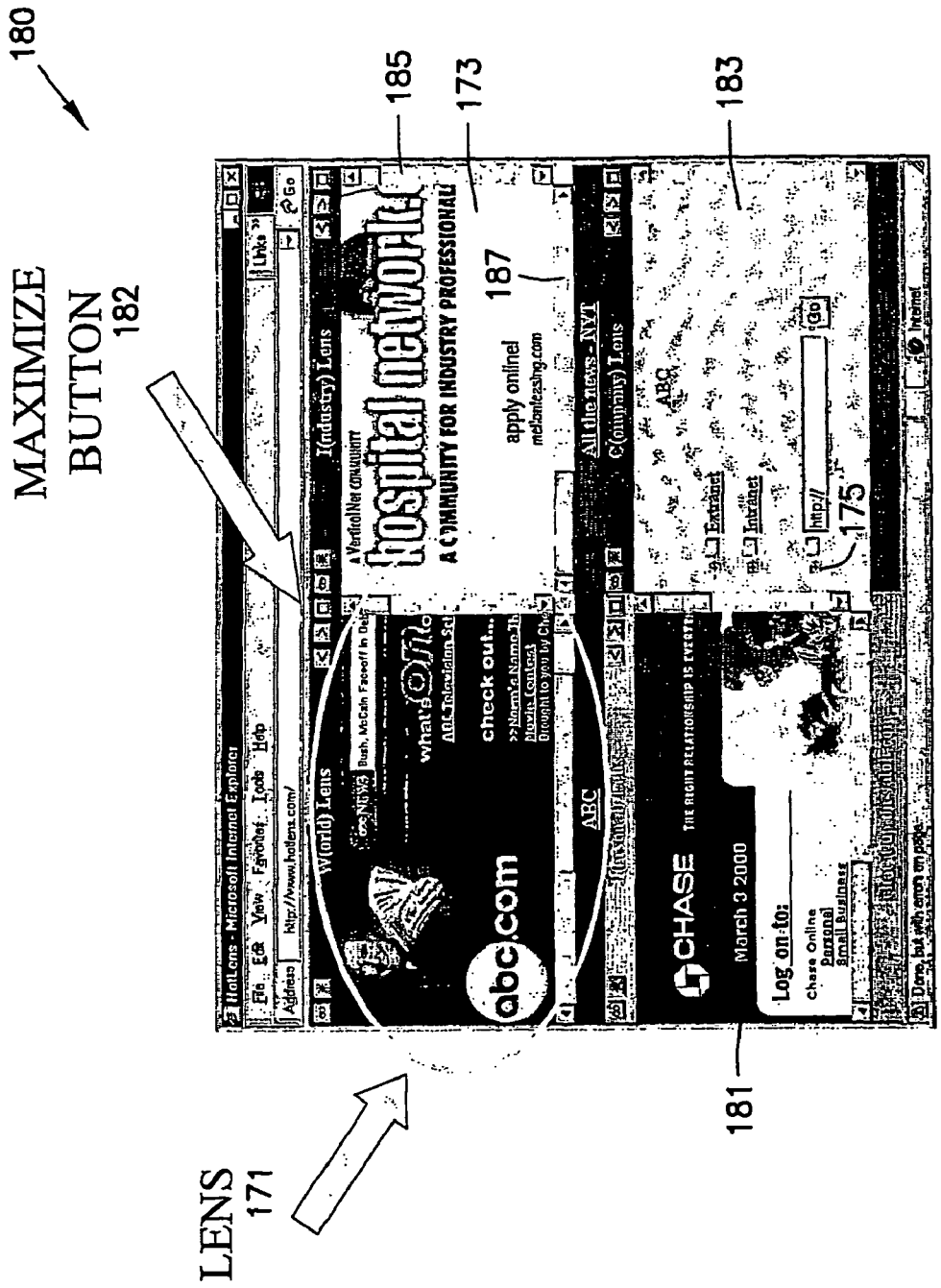
FIG. 18 is an exemplary screen display depicting a plurality of lenses within a single browser window.
Figure 19:
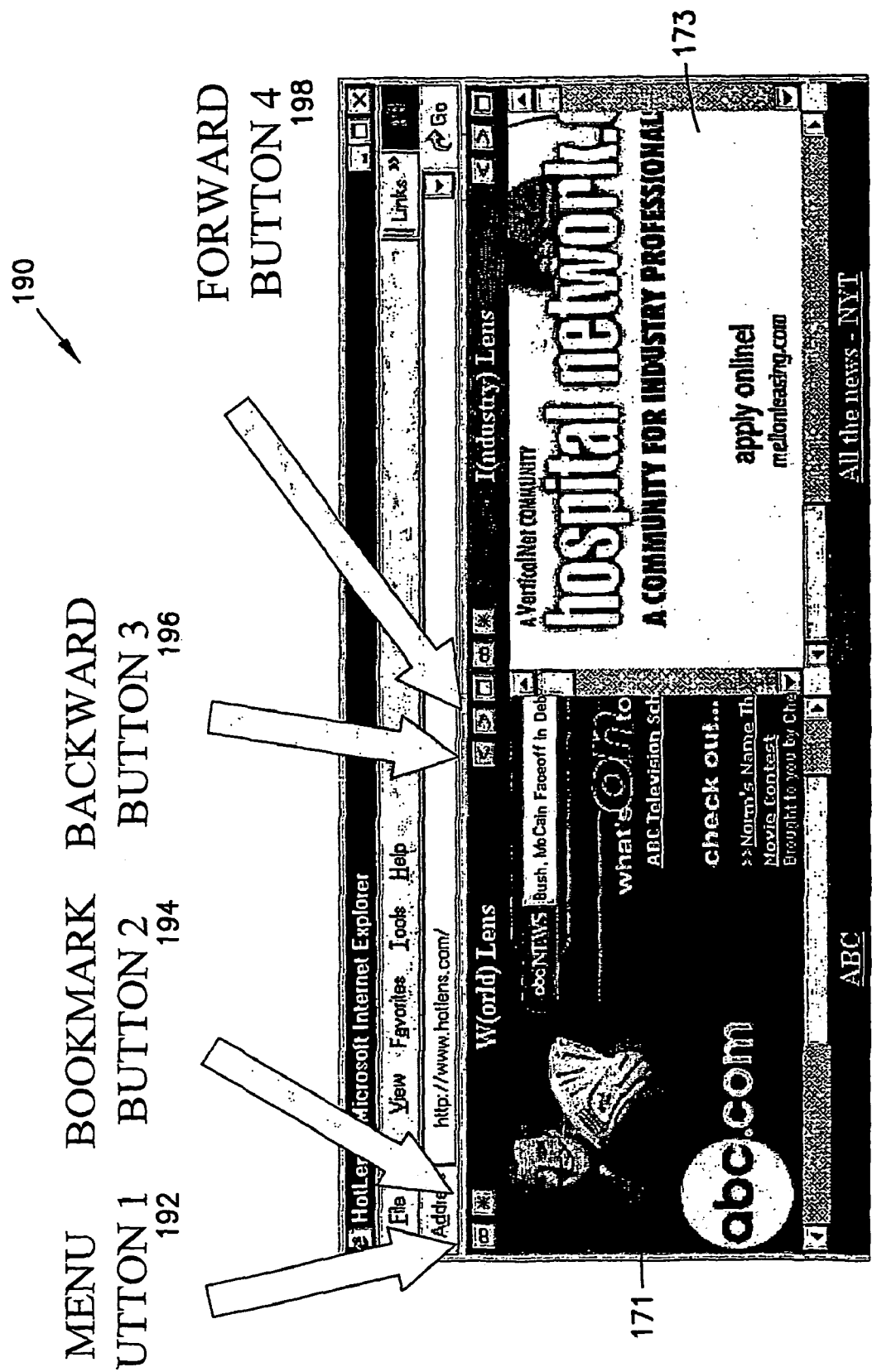
FIG. 19 is an exemplary screen display of a lens having full browser capability.

After signing in, the server 16 may verify the sign-in information provided by the user, e.g., confirm its validity, and transmit a screen display such as that depicted in window 180 of FIG. 18. The screen display may present the last web page(s) browsed by the user (step 34). The window 180 may have at least one lens, two lenses, three lenses, four lenses 171, 173, 181 and 183, or more, each of which may present any URL indicated by the user. Each lens may have independent navigational controls, such as a maximize command button 182, a vertical scroll bar 185, and a horizontal scroll bar 187 as shown in FIG. 18, as well as a menu command button 192, a bookmark button 194, a backward command button 196, and a forward command button 198 as depicted in window 190 of FIG. 19, the functionality of each being described further hereinbelow. Each lens may further have a full range of navigational controls, i.e., full browser control capability.

In one embodiment, one lens may control the web content displayed in another lens. For example, a user may use a first lens as a search engine to conduct an informational search on any topic. The results of the search can be directed by the first lens to be displayed in a second lens.

In some cases, the validity of the sign-in information may be confirmed by matching the user-entered information to user data stored by server 16 in memory 22. The stored user data may be in the form of a secure database (not shown) having a number of records and fields for storing user names, passwords, company affiliation information, a history of web pages viewed by the user, and the like. If there is no data that matches the user-entered information, then the user may not access the server. Otherwise, the process 30 continues as described below.

Figure 17:
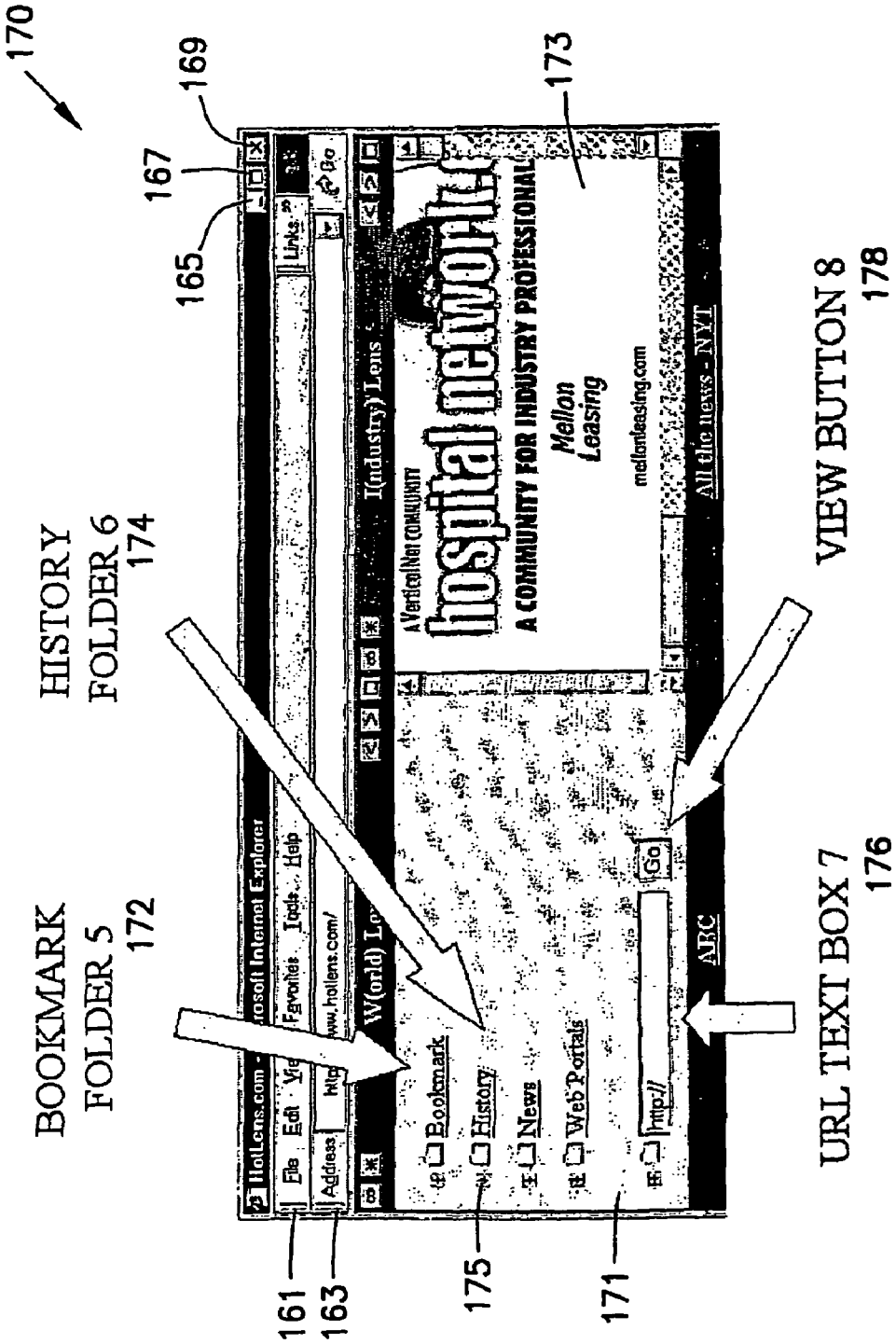
FIG. 17 is an exemplary screen display of a hierarchical tree structure (i.e., a menu) for administering the content of a lens.

From step 34, the user may decide to enter a new page to view, bookmark a page, view a previous page in the user's history or view a next page in the viewer's history. If the user chooses to enter a new web page to view, the process continues to step 36 where the user selects the menu command button 192 from one of the lenses 171, 173, 181, 183 in which the user chooses the web page to be displayed. The menu command button 192 may be selected by using a pointing device such as a mouse or by using a tab feature on the device 2 to select the menu command button 192. The local web browser residing on the user's device 2 then electronically forwards the command over network connection 8 to the application host server 16 (step 38). In response to the received command, the server 16 can return a menu web page 175 as depicted in FIGS. 17 and 18 (step 40).

The hierarchical tree structure or menu web page 175 enables the user to select a number of options, including selecting a bookmark folder 172, a history folder 174, and a field 176 for entering a URL. The menu web page may further contain a news folder for selecting news articles or web sites, a web portal folder for selecting a desired portal, an intranet option for selecting intranet files, and an extranet folder for selecting extranet files. If the user selects the bookmark folder, the process 30 continues to step 88, as discussed below with respect to FIG. 9. If the user selects the history folder 174, the process continues to step 96 as described below with respect to FIG. 10. Alternatively, the user may instead enter a desired URL into URL entry field 176 (step 42) and then select the view button 178 to transmit the requested URL to the server 16 (step 44). The process 30 then continues to step 104 discussed below in conjunction with FIG. 11.

As described above with respect to step 34, a user may proceed to bookmark a web page after the remote server transmits display information to the user. In such a case, the process 30 continues to step 46 where the user selects the bookmark button 194 in a lens in which the desired web page is displayed. The browser residing on the user's device 2 then transmits the bookmark command to the server 16 over network connection 8 (step 48). The bookmark command may be performed in a single step, that is, by selecting the bookmark command button 194 without additional inputs. The server 16 may then store the bookmark in a location which is accessed through the user's bookmark folder 172 (step 50). The server 16 may then refresh the current web page being viewed (step 52) which is then displayed in the appropriate lens on the user's device 2 (step 54), after which the process 30 returns to step 34, described above.

Figure 6:
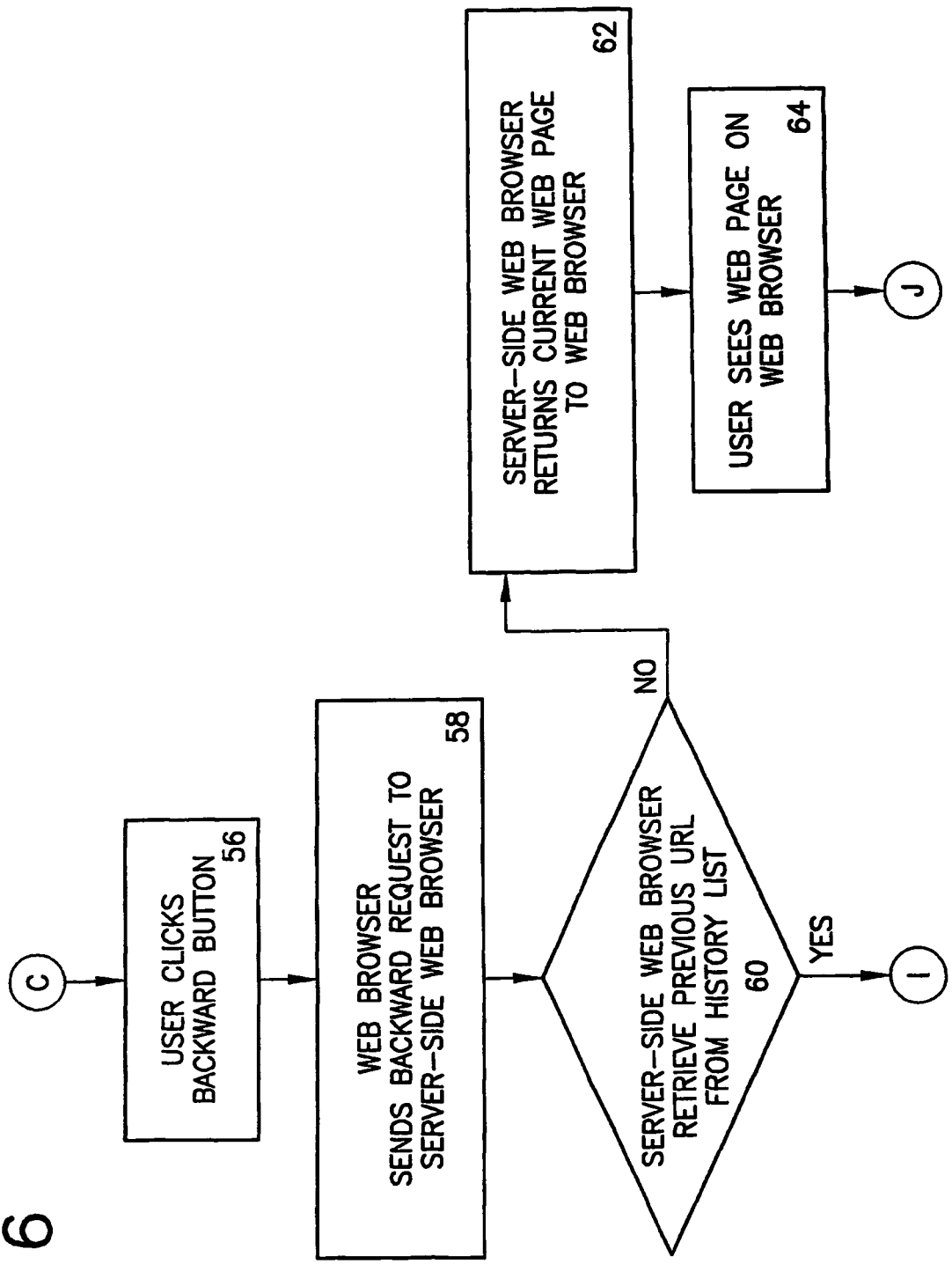

Referring now to FIG. 6, the process 30 may continue from step 34 to step 56 where the user may select the backward command button 196 in a desired lens. Similar to the back command on a standard browser, the backward command is a request to view a previous web page in a viewing history of the selected lens. In response to the selection of the backward command button 196, the web browser residing on the user's device 2 transmits the backward command to server 16 over network connection 8 (step 58). If a previously-viewed web page exists, the process 30 continues to step 76, discussed below with respect to FIG. 8. Otherwise, the process 30 continues to step 62 where the server 16 refreshes the current web page being viewed, after which the refreshed web page is displayed on the user's device 2 (step 64). The process 30 then returns to step 34, discussed previously above.

Figure 7:
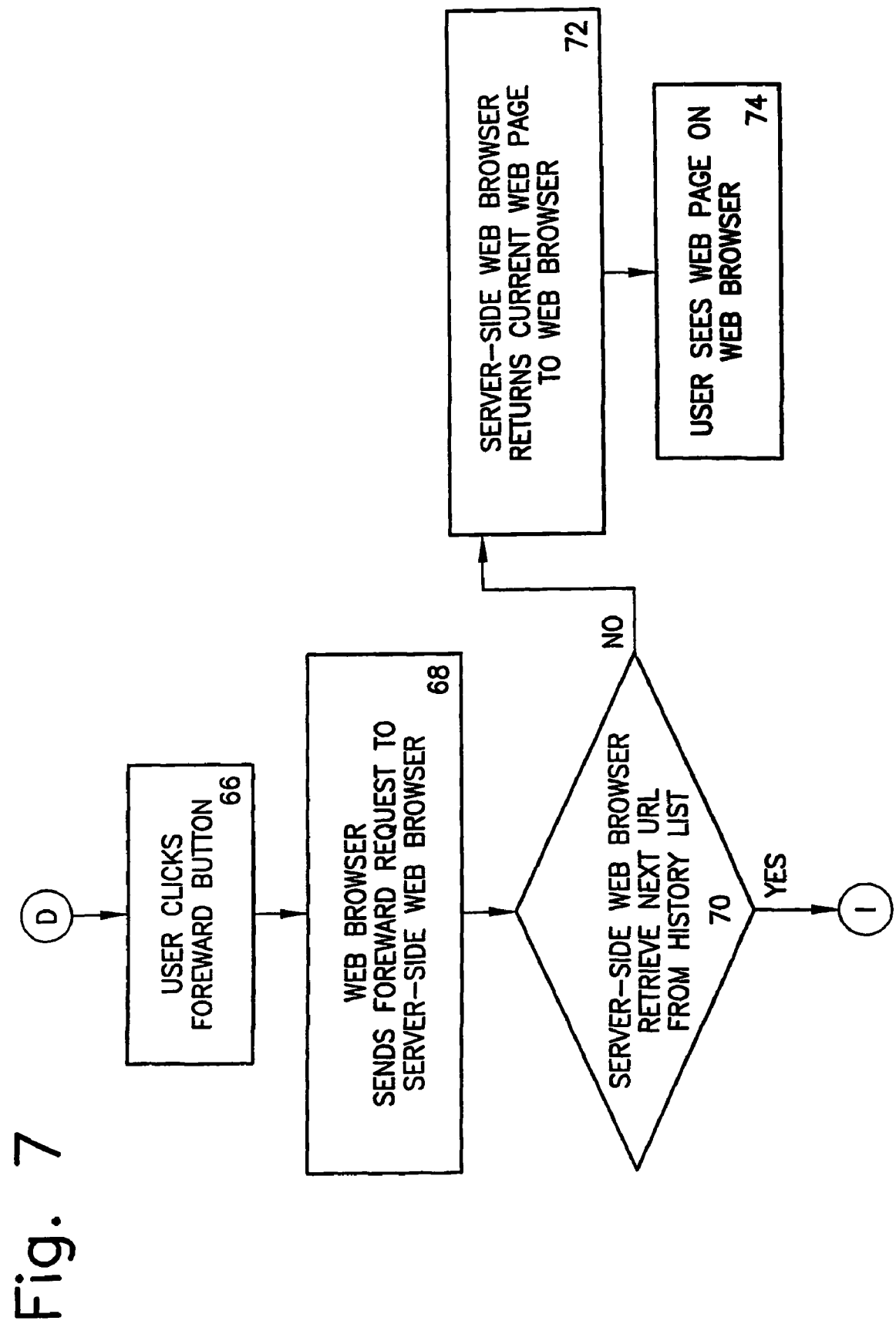

Referring now to FIG. 7, the process 30 may continue from step 34 to step 66 where the user may select the forward command button 198 in a desired lens. Similar to the forward command on a standard browser, the forward command of the system is a request to view a subsequent web page in a viewing history of the selected lens. In response to the selection of the forward command button 198, the web browser residing on the user's device 2 transmits the forward command to server 16 over network connection 8 (step 68). If a next web page exists, the process 30 continues to step 76, discussed below with respect to FIG. 8. Otherwise, the process 30 continues to step 72 where the server 16 refreshes the current web page being viewed, after which the refreshed web page is displayed on the user's device 2 (step 74). The process 30 then returns to step 34, discussed previously above.

Figure 8:
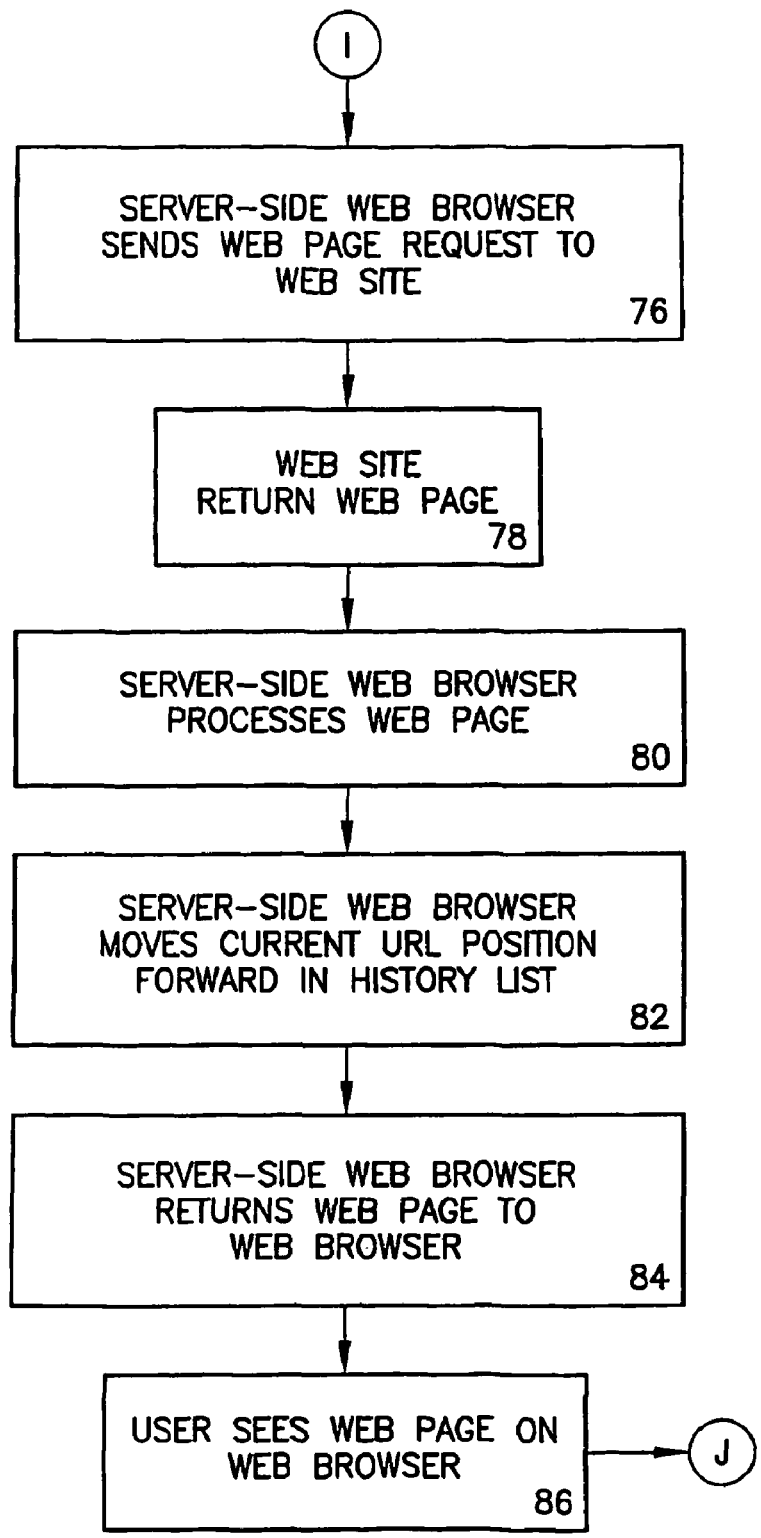

Referring now to FIG. 8, process 30 continues from either step 60 or 70 described above to step 76 where the server 16 transmits a request over network connection 8 to a third-party server (e.g. web site server 10, 12, 14) which hosts the requested web page. In response, the third-party server transmits web page data to the server 16 (step 78). The server 16 may then process the received data into a format suitable for transmission to the user's device 2 (step 80). The server 16 may further add the URL corresponding to the received data to the user's viewing history (step 82). The server 16 then transmits web page display data to the user including the reformatted web page data (step 84) which is then displayed in the appropriate lens on user device 2 (step 86). The process 30 then returns to step 34 above.

In processing the web page display data received from a third party server, the host server can translate such data on the fly for presentation on a user device. For example, data received from a third party server may be in any form, including HTML, CSS, XML, XSL, XHTML or WML. The host server can translate such data into any other form, such as HTML or WML, for presentation on a user's device. As discussed further below, the host server can further reformat web page data received from a third party server on the fly.

Figure 9:
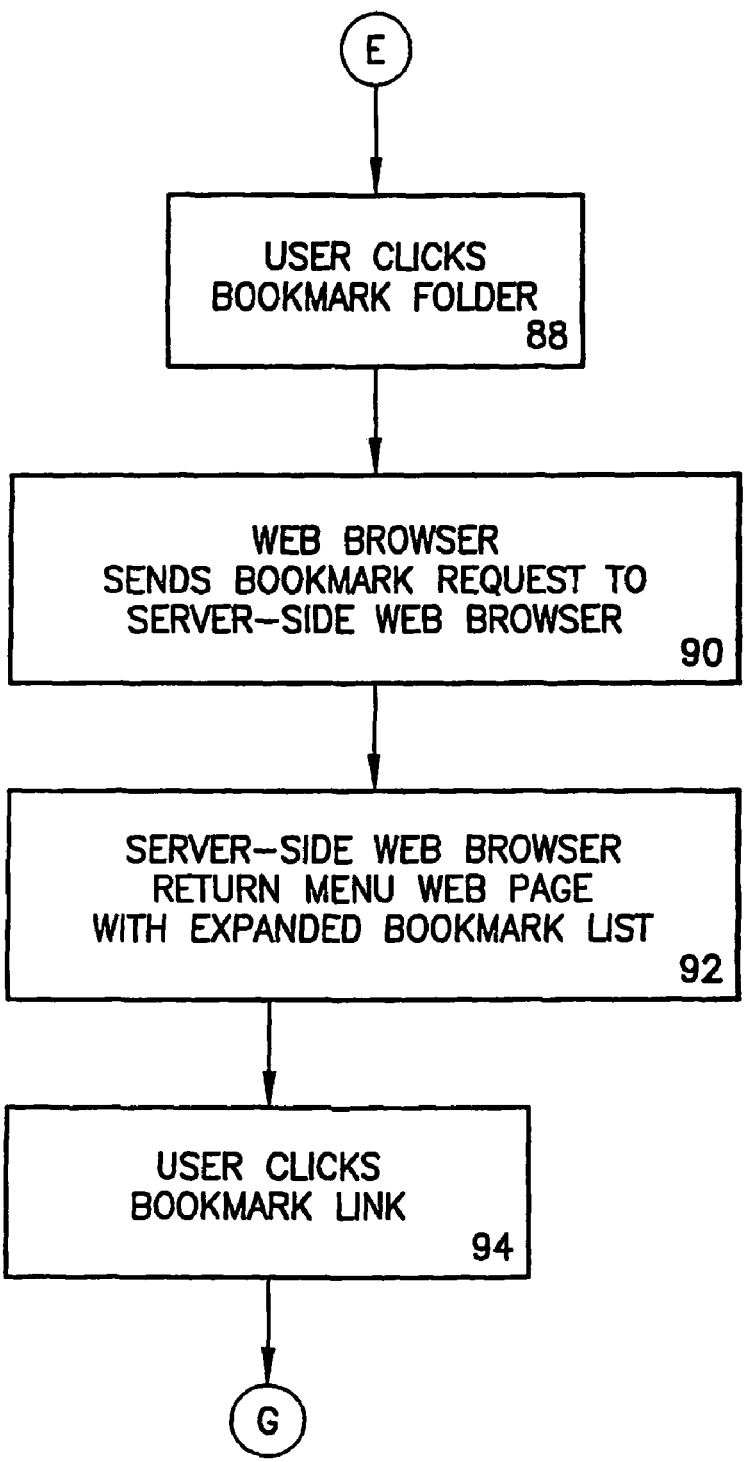

Turning to FIG. 9, process 30 may continue from step 40 described above to step 88, where the user selects the bookmark folder 172 from a menu web page 175 displayed in a lens 171. The browser on the user's device 2 then transmits a bookmark folder request over network connection 8 to server 16 (step 90). In response to the request, the server 16 generates a bookmark list page showing all the bookmarks stored for the user and transmits the data for display in the lens 171 on the user device 2 (step 92). The user may then choose one of the desired bookmarks (step 94) after which the process 30 continues to step 104, described below with respect to FIG. 11.

Figure 10:
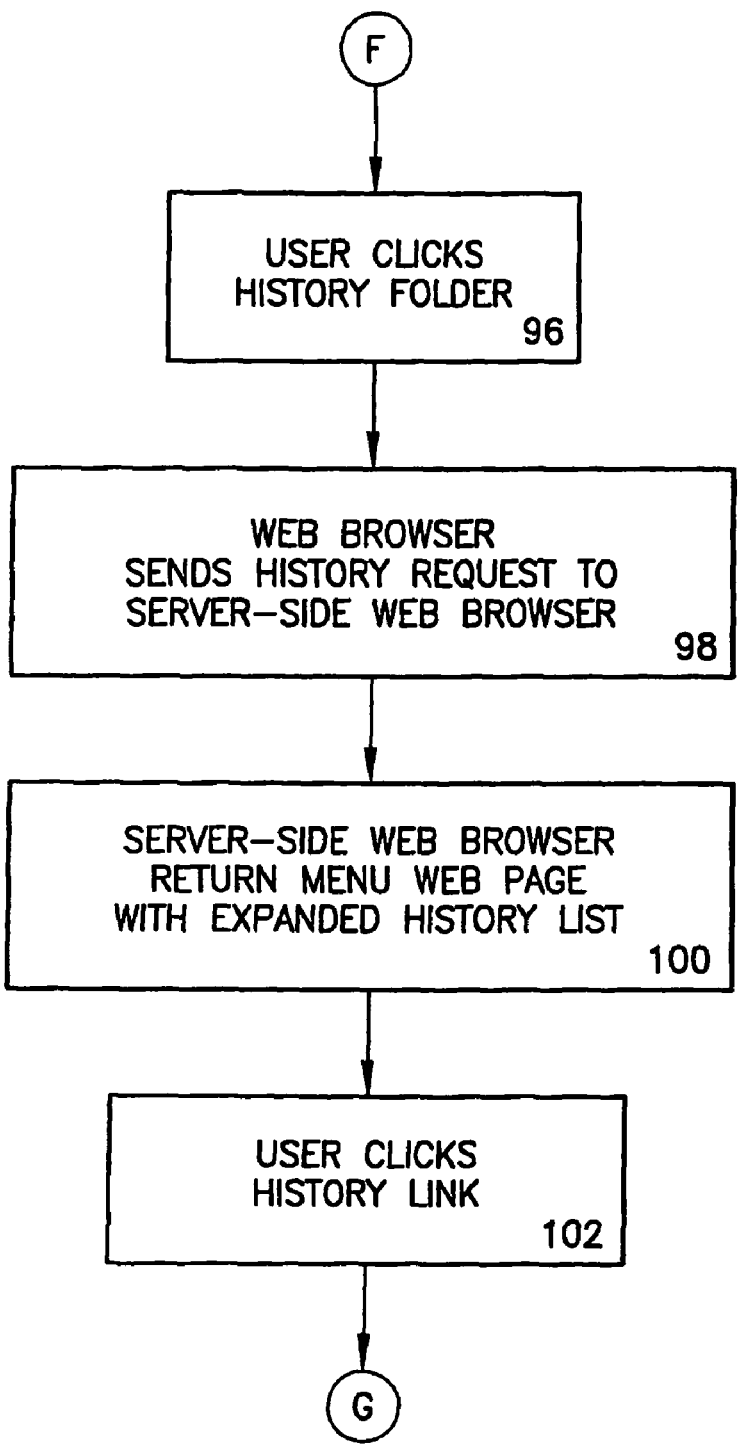

Referring now to FIG. 10, the process 30 may continue from step 40 to step 96 where the user may select the history folder 174 from the menu web page 175 displayed in the lens 171. The web browser residing on user device 2 then transmits a request for viewing history data to server 16 over network connection 8 (step 98). The server 16 then generates a page displaying a predetermined number of web pages which the user has previously visited and transmits the same for display in the lens 171 of user device 2 (step 100). The user may then select one of the web pages from the viewing history (step 102), after which the process 30 continues to step 104, discussed immediately below.

Figure 11:
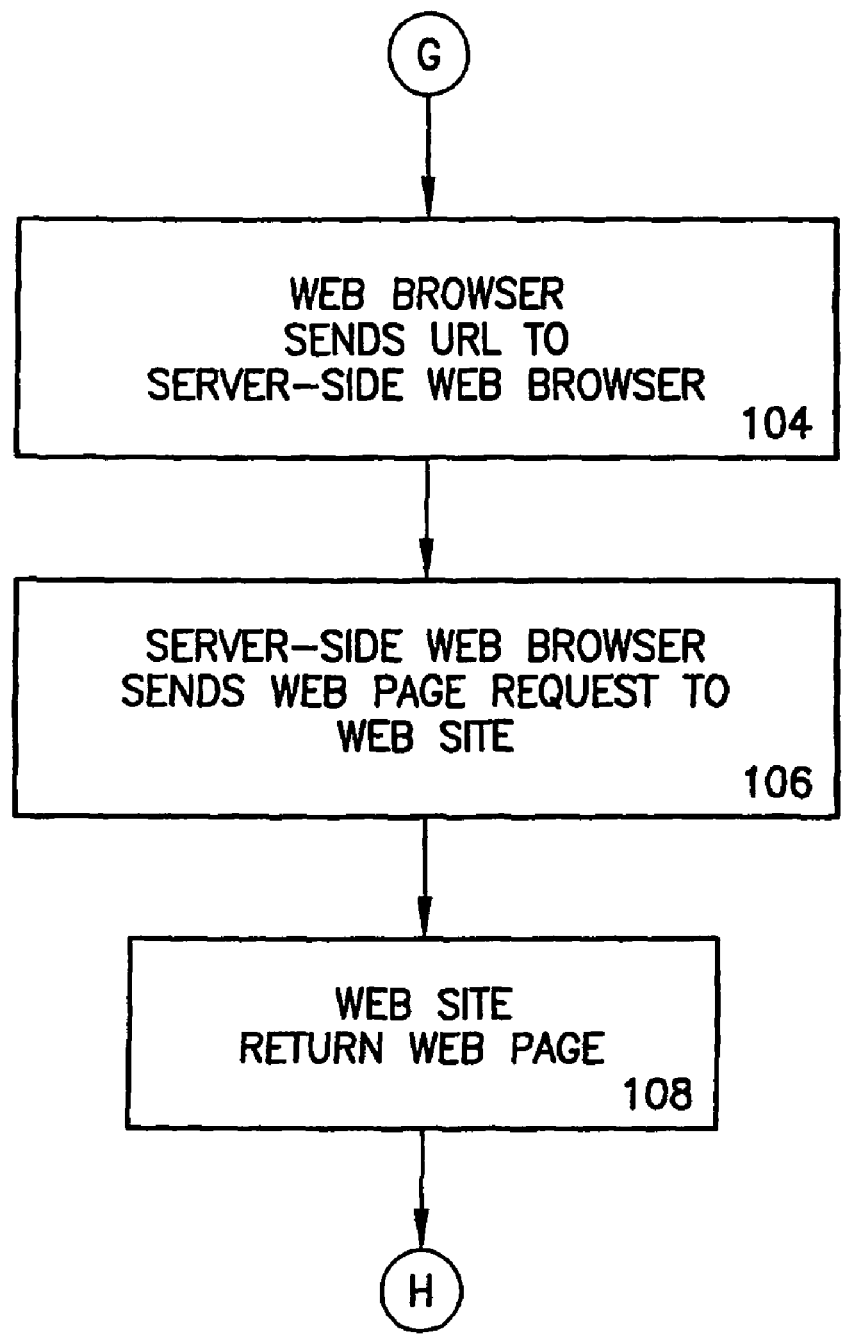

Referring now to FIG. 11, the process 30 may continue from any of steps 44, 94 or 102 described above to step 104 where the browser residing on the user's device 2 transmits a requested web page to the server 16 over network connection 8. The server 16, in turn, sends a request for the web page to the appropriate third-party server, e.g. web site server 10, over network connection 8 (step 106). The third-party server then transmits the requested web page data back to the server 16 (step 108), after which the process 30 continues to step 110, discussed immediately below.

Figure 12:
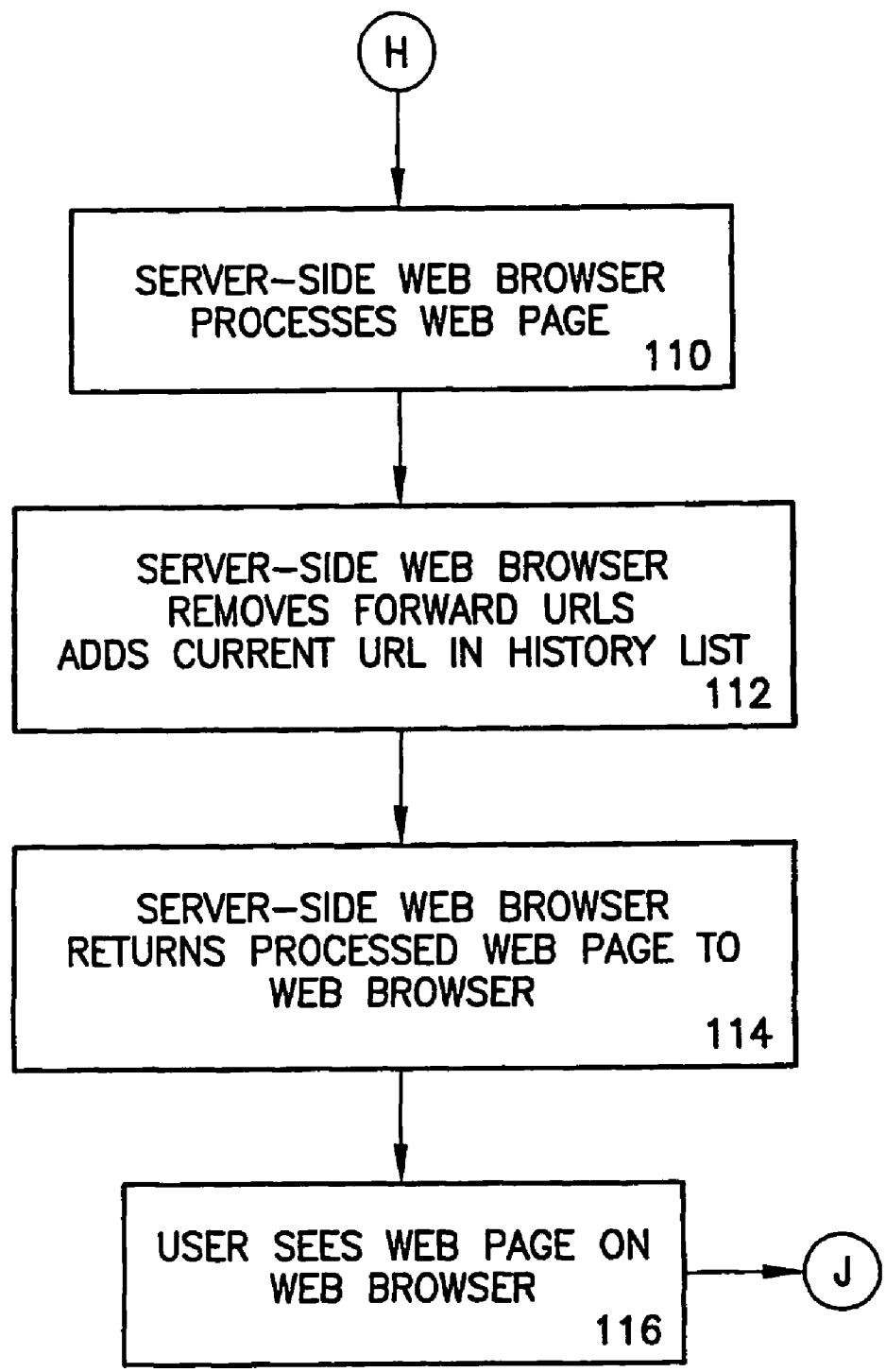

Turning now to FIG. 12, the process 30 continues to step 110 where the server 16 processes the received web page data to generate display data wherein the requested web page will be presented in the appropriate lens 171. The server 16 then adds the current URL to the most recent spot in the user's viewing history folder (step 112). Next, the server 16 transmits the generated display data to the user device 2 over network connection 8 (step 118). Upon receipt, the web browser residing on the user's device presents the multi-lens display to the user with the requested web page displayed in the appropriate lens 171 (step 116). The process 30 then returns to step 34, described above. Process 30 may continue until the user exits the browser, turns off the user device 2, or otherwise halts communication with server 16.

Figure 13:
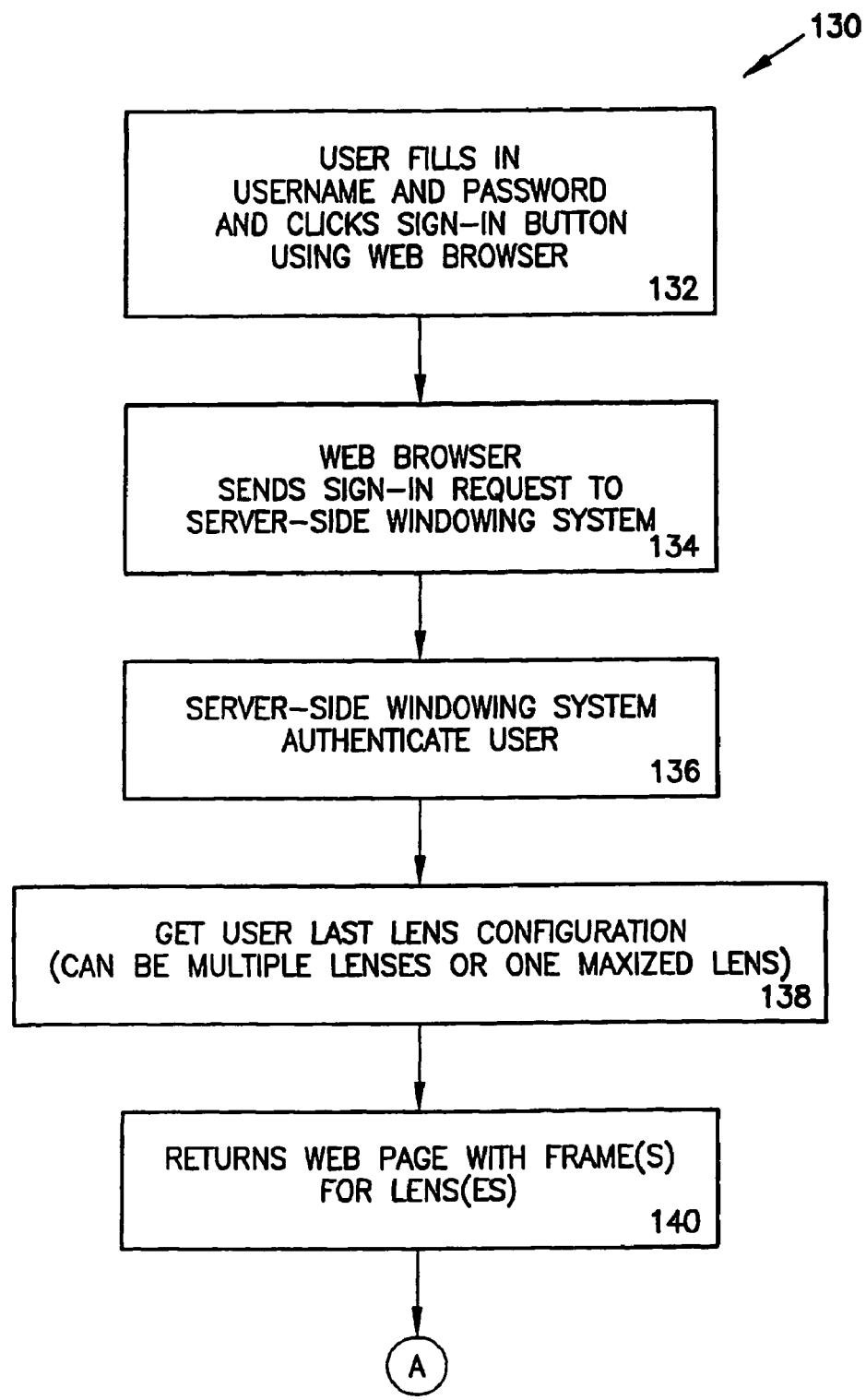
FIGS. 13-15 are a flowchart of an exemplary process by which a user may maximize or minimize a lens containing web page display data.

In addition to providing a user with the ability to view multiple web sites in a suitable number of lenses within a single browser window, and to navigate through different web sites using command buttons presented by a remote server 16, one embodiment allows a user to maximize a selected web page within the browser window. A process 131 for maximizing and minimizing one of a plurality of web pages within a single browser window is presented in FIGS. 13-15. Referring now to FIG. 13, the process 130 begins after a user enters a URL for a host server 16 in the URL entry line 163 of the browser residing on user device 2 which, in turn, establishes a link to the server 16 via network connection 8. The server 16 first transmits a sign-in page, such as the one presented in window 160 of FIG. 16.

The user may fill in a user name and password in the appropriate fields 162 and 164, as well as affiliation information, if applicable, and selects the sign-in button 168 (step 132). The local browser then transmits the sign-in request to the server 16 over network connection 8 (step 134). Upon receipt, the server 16 matches the received sign-in information to valid, stored user sign in data, and authenticates the user if matching data is found (step 136). The server 16 may also retrieve the last web pages viewed by the user and generates display data including at least two frames which display the last web pages viewed (step 138). The display information is then transmitted over network connection 8 to the user device 2 for display to the user (step 140). The display information may include HTML FRAME or IFRAME commands for generating the multiple lens display. The process 130 then continues to step 142, described immediately below.

Figure 14:
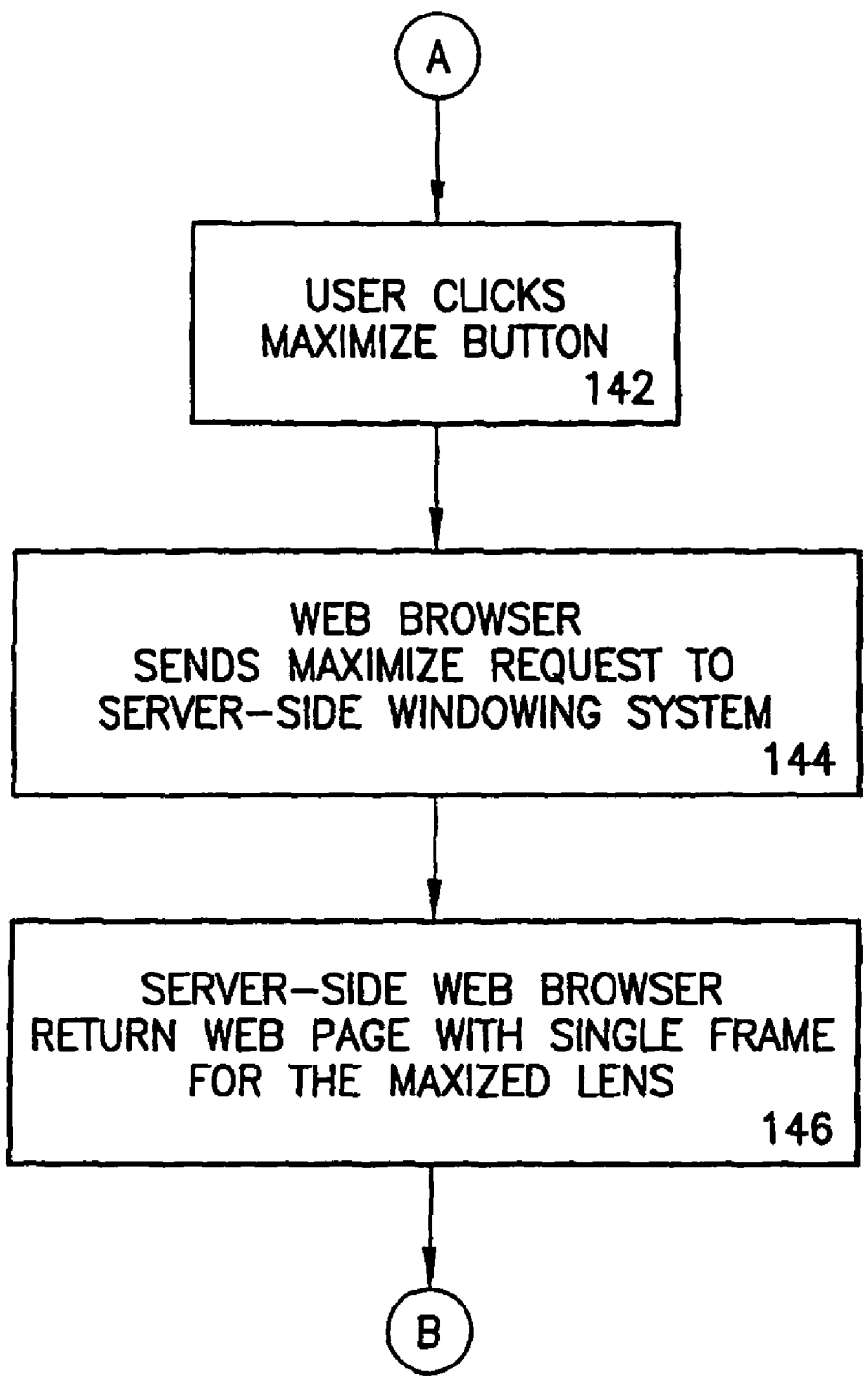

Turning now to FIG. 14, the process 130 continues to step 142 where the user may wish to view a maximized version of a web page displayed in one of the plurality of lenses 171, 173, 181, 183. To accomplish this, the user may select the maximize button 182 in the desired lens. The local browser then transmits the maximize request to the server 16 over network connection 8 (step 144). In response, server 16 generates new display data in which only the selected web page will be viewed within the browser window. The new display data is then transmitted to the user device 2 over the network connection 8 (step 146). The resulting display may resemble the window 200 in FIG. 20. The process 130 then continues to step 148, discussed below.

Figure 15:
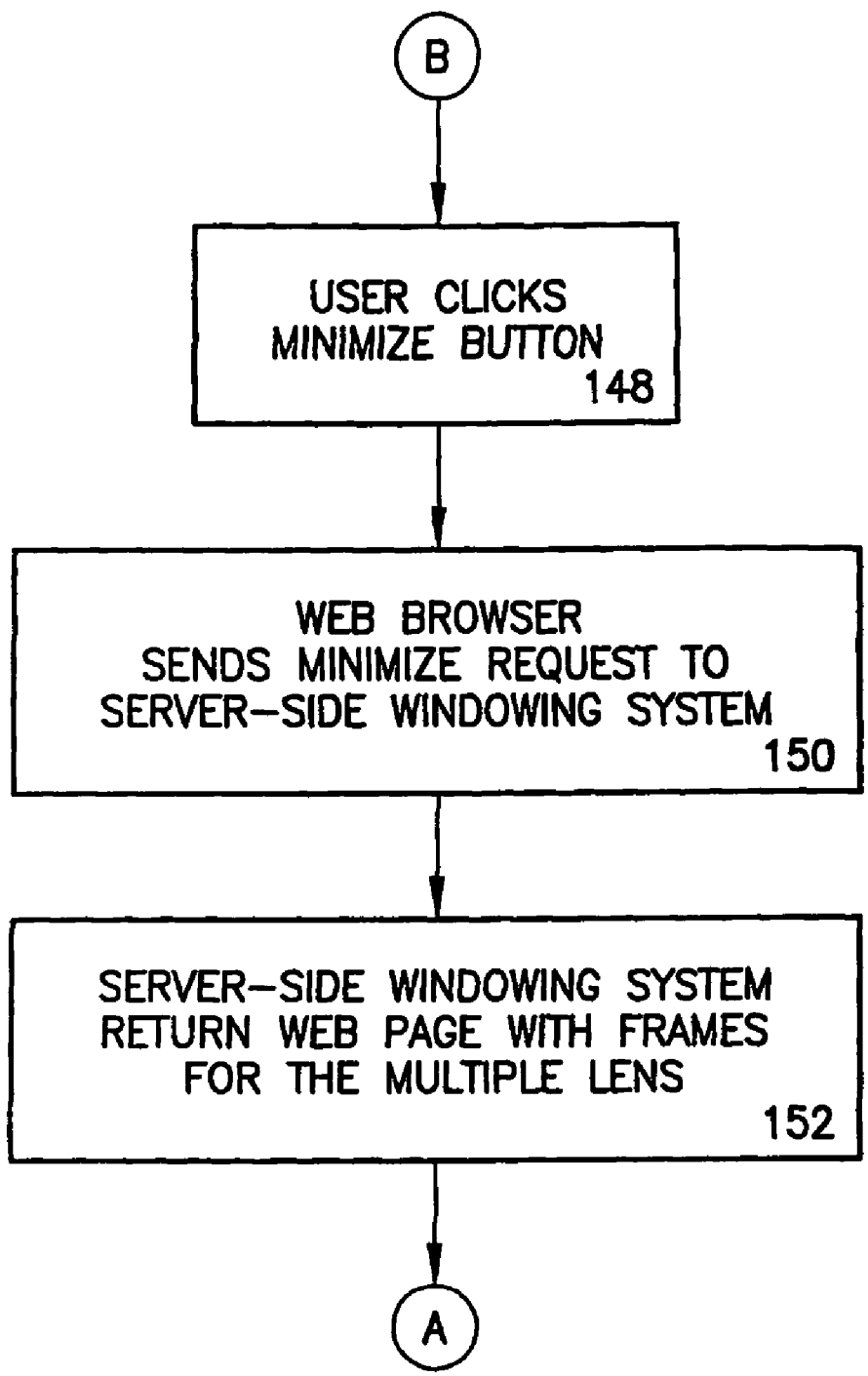

Turning now to FIG. 15, the process continues to step 148, where the user enters a command to minimize the web page.

Figure 20:
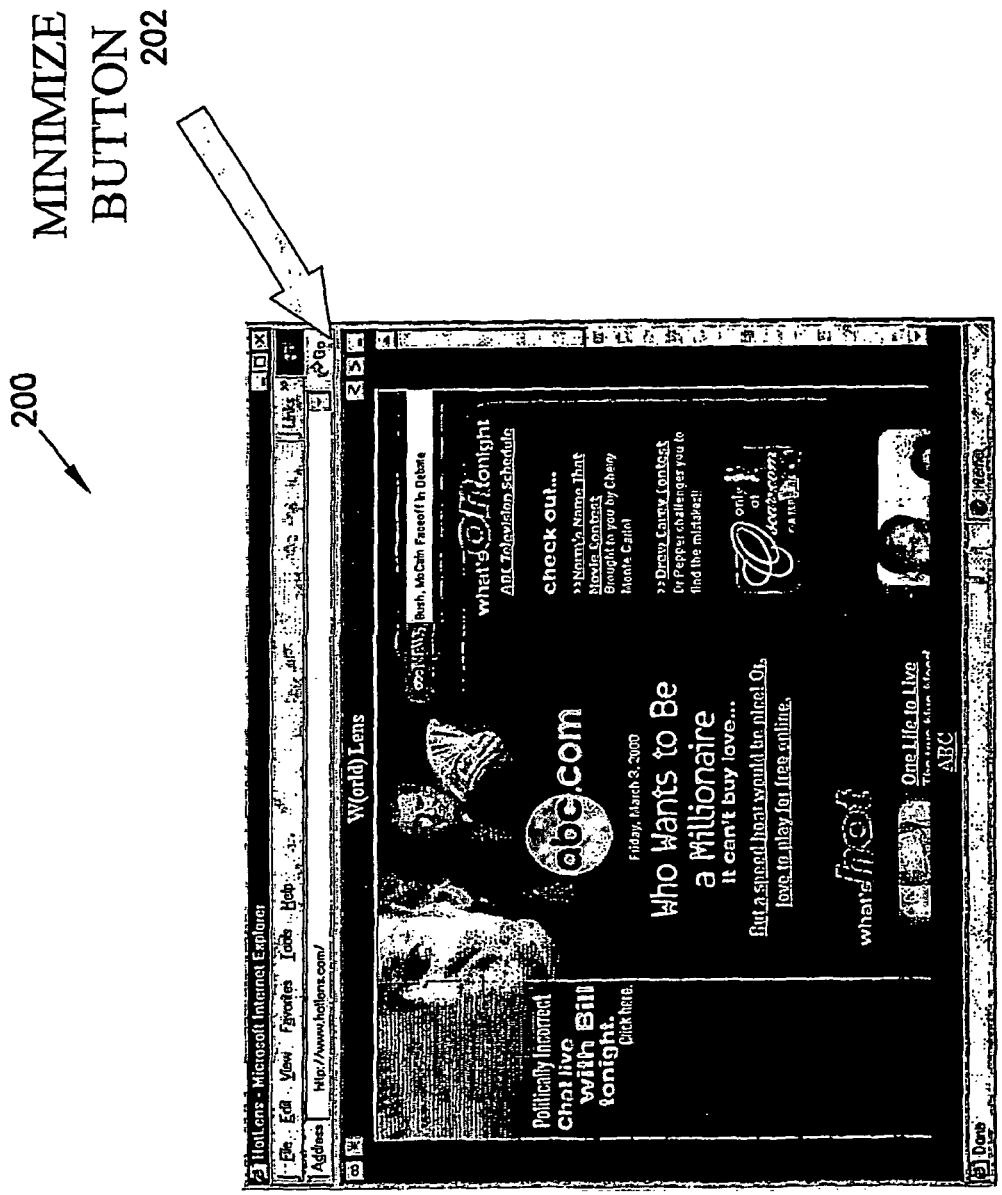
FIG. 20 is an exemplary screen display of a maximized lens.

This may be accomplished by selecting the minimize button 202 as displayed in FIG. 20. The local browser transmits the minimize request to the server 16 over the network connection 8 (step 5 150). The server 16 then generates new display data including the plurality of lenses with the formerly maximized web page presented in its original lens (step 152), after which the process 130 returns to step 142, described above. Process 130 may continue until the user exits the browser, turns off the user device 2, or otherwise halts communication with server 16.

In another embodiment, it is possible for the server to store multiple cookies for each lens of the user's display. Cookies refer to files transmitted by third-party servers 10, 12, 14 and which are typically stored in memory 22 of a user's device 2. The cookies may serve to identify the user to the third-party server. Rather than storing cookies on the user's device 2, the server 16 may store the cookies in the server's memory 22 and associate the same with the particular user. Cookies may be further designated as belonging to a particular lens of the user's multiple lens display rather to the user in general.

In still another embodiment, the display information may be configured by the server 16 so that substantially all the content of a selected web page may be reformatted to fit within the display area of a lens or browser window. Typically, a web page contains more data than will fit within the display area of a window. In such a case, horizontal and vertical scroll bars 187, 185 are provided so that a user may view all the content of the web page. However, it may be desirable to allow the user to view the entire content at once. Accordingly, the system, method and apparatus allow the server to reformat the display information received from a third party server 10 so that substantially all the content of a web page can be presented within the display area of a lens or a local browser window. This may be accomplished by reducing the font size of the text of the web page, compressing pixel data associated with the web content, or in any other manner. The display data of a selected web page may be reformatted to present substantially all content of the web page within the display area of each lens, either automatically or in response to a user request. A user can request that the web page display data be reformatted to any percentage of its original size. Alternatively, the system can be utilized to increase the size of web page data so that it is substantially the same size as a larger display area.

The server-side web browsing and multiple lens system, method and apparatus enables dynamic miniaturized viewing of web pages. The system, method and apparatus is particularly suitable for thin-client technology where the viewing screen is on a small scale basis, such as in a multiple lens system described herein wherein the display area of each lens may be substantially smaller than the browser window, or in hand-held remote access wireless devices or PDA's.

Figure 21:
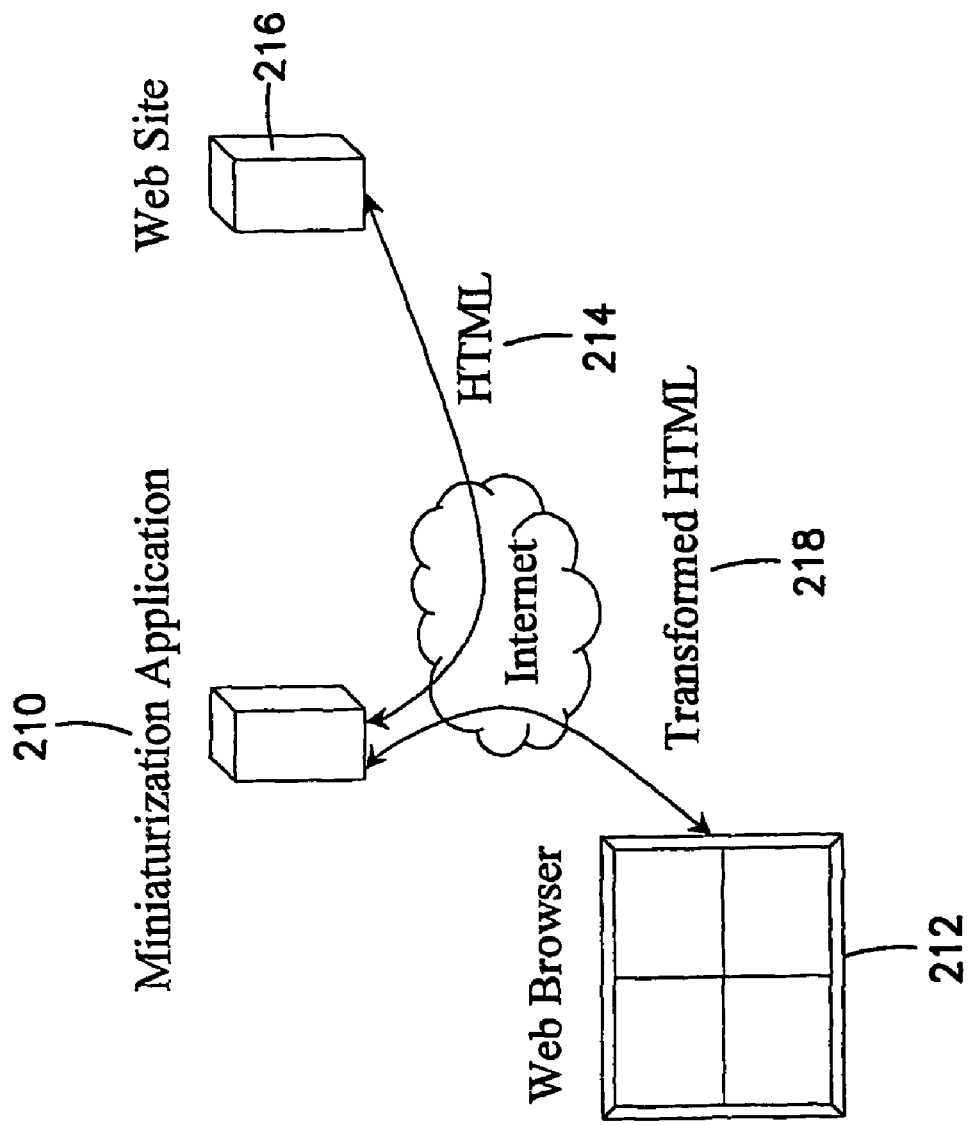
FIG. 21 is an exemplary network illustrating a dynamic miniaturization application.

FIG. 21 illustrates miniaturization application 210 as it is applied to a multiple lens display in web browser 212. To view a web page, a web browser sends a request with the appropriate URL to the system that in turns retrieves the HTML content 214 from the corresponding web site 216. The system applies the appropriate transformations to the HTML content before forwarding the reformatted or transformed HTML 218 to web browser 210. The transformations reduce the view size of the web content so that the web content can be easily viewed within a small size viewing area.

Figure 22:
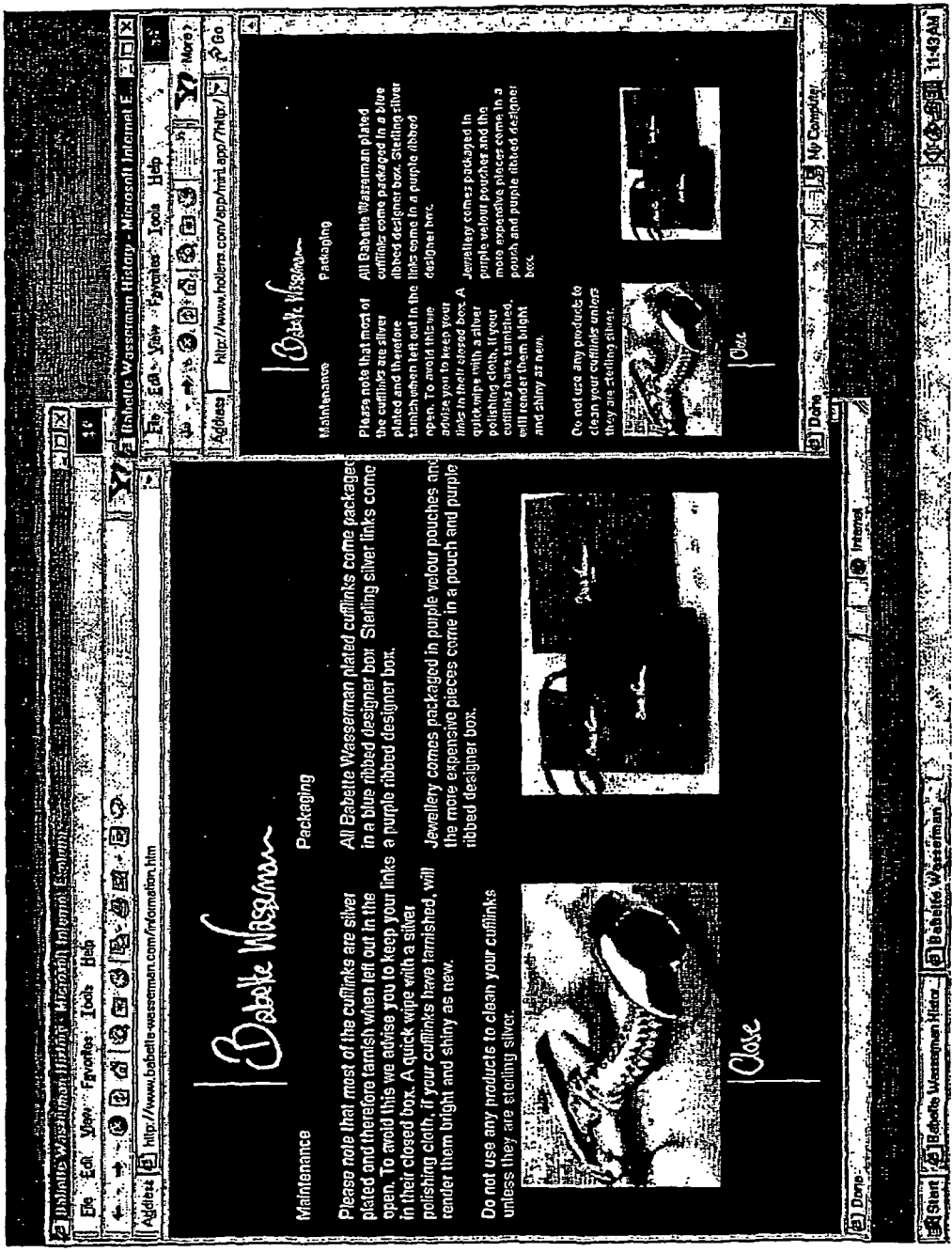
FIG. 22 is an exemplary illustration of a miniaturized web page to be presented within a display area of a lens or a browser window.

The system uses cascading style sheet technology to reduce the default text size of a web page. It also transforms the width, height and size attributes to HTML tags such as <table>, <td>, <img>, and <font>. In an exemplary illustration of the transformations, the system is programmed to reduce the view size by 50%. The system sets the default text size using cascading style sheet to 8 point size where the normal size is 12 point size. The system also reduces the width, height and size attributes of HTML tags such as <table>, <td>, <img>, and <font>, to half the original value. An example of a reformatted web page shown in its reduced size is illustrated in FIG. 22.

In an alternative embodiment, the system can be programmed to automatically reduce or enlarge the view size of a web page to any percentage of its original size, e.g., 50%, 75%, 125%, 150%, 200%. Alternatively, the system can reduce or enlarge the view size of a web page to any percentage selected by a user.

Although illustrative embodiments have been described herein in detail, it should be noted and understood that the descriptions have been provided for purposes of illustration only and that other variations both in form and detail can be made thereupon without departing from the spirit and scope of this invention. The terms and expressions have been used as terms of description and not terms of limitation. There is no limitation to use the terms or expressions to exclude any equivalents of features shown and described or portions thereof and this invention shown be defined with the claims that follow.

The invention claimed is:

1. A method, performed by a host server, for reformatting a web page presented at a remote device, comprising:
    electronically transmitting by the host server a web page corresponding to a received uniform resource locator for display in a first lens presented within a window of a browser on the remote device, the transmitted web page comprising display data and specifying a first font size, only a portion of the display data being visible within a first display area of the first lens using the first font size, the browser further comprising a second lens within the window of the browser;
    electronically receiving a request by the host server from the remote device to reformat the transmitted web page, the request to reformat indicating to the host server to fit all of the display data into the first display area of the first lens; and
    in response to the request:
        electronically reformatting by the host server the transmitted web page, the reformatting comprising specifying that at least a portion of the display data be displayed using a second font size; and
        electronically transmitting by the host server the reformatted web page for display in the first display area of the first lens, all of the display data being viewable within the first display area without using a horizontal scroll bar or a vertical scroll bar.

2. The method of claim 1, wherein transmitting by the host server the reformatted web page comprises transmitting the reformatted web page wherein all of the display data is visible within the first display area.

3. The method of claim 1, wherein transmitting by the host server the reformatted web page comprises transmitting the display data reformatted to a percentage of its original size as identified in the request.

4. A method implemented in a computing system comprising:
    electronically transmitting a uniform resource locator to a host server through a first lens presented within a window of a browser on a remote device, the browser further comprising a second lens within the window of the browser;

electronically receiving a web page corresponding to the uniform resource locator displayed in the first lens presented within the window of the browser, the web page comprising display data and specifying a first font size, only a portion of the display data visible within a first display area of the first lens using the first font size, the browser further comprising a second lens within the window of the browser;

electronically transmitting a request to reformat the received web page, the request to reformat indicated to fit all of the display data into the first display area of the first lens; and in response to the request electronically receiving the reformatted web page for display in the first display area of the first lens, all of the display data being viewable within the first display area using a second font size without using a horizontal scroll bar or vertical scroll bar.

5. The method of claim 4, wherein receiving the reformatted web page in response to the request comprises receiving the display data such that all of the display data is visible within the first display area.

6. The method of claim 4, wherein receiving the reformatted web page in response to the request comprises receiving the display data reformatted to a percentage of its original size selected by a user.

7. A method, performed by a host server, for reformatting a web page presented at a remote device, comprising:

electronically transmitting by the host server a web page corresponding to a received uniform resource locator for display in a first lens presented within a window of a browser on the remote device, the web page comprising display data and specifying a first font size, only a portion of the display data being visible within a first display area of the first lens using the first font size, the browser further comprising a second lens within the window of the browser;

electronically receiving by the host server a request from the remote device to reformat the transmitted web page, the request to reformat indicating to the host server to fit all of the display data into the first display area of the first lens; and in response to the request:

electronically determining by the host server whether the display data has a size greater than or less than the first display area of the first lens;

electronically reformatting the transmitted web page if the size of the display data is greater than or less than the first display area, the reformatting comprising specifying that at least a portion of the display data be displayed using a second font size; and electronically transmitting by the host server the reformatted web page for display in the first display area of the first lens, all of the display data being viewable within the first display area without using a horizontal scroll bar or vertical scroll bar.

8. The method of claim 7, wherein transmitting by the host server the reformatted web page comprises transmitting the reformatted web page to the remote device such that all of the display data is visible within the first display area.

9. The method of claim 7, wherein transmitting by the host server the reformatted web page comprises transmitting the display data reformatted to a percentage of its original size selected by a user.

10. A host server for reformatting a web page presented at a remote device, comprising:

computing memory and a coupled processor, the processor operative to:

receive a uniform resource locator received through a first lens presented within a window of a browser on the remote device, the browser further comprising a second lens within the window of the browser;

transmit a web page corresponding to the uniform resource locator for display in the first lens within the window of the browser, the web page comprising display data and specifying a first font size, only a portion of the display data being visible within the first display area of the first lens using the first font size;

receive a request from the remote device to reformat the transmitted web page, the request to reformat indicating to the host server to fit all of the display data into the first display area of the first lens; and in response to the request:

reformat the transmitted web page, the reformatting comprising specifying that at least a portion of the display data be displayed using a second font size; and transmit the reformatted web page for display in the first display area of the first lens, all of the display data being viewable within the first display area without using a horizontal scroll bar or a vertical scroll bar comprised in navigation controls of the first lens.

11. The host server of claim 10, wherein the processor is further operative to transmit the reformatted web page such that all of the display data is visible within the first display area.

12. The host server of claim 10, wherein the processor is further operative with the program to transmit the reformatted web page reformatted to a percentage of its original size selected by the remote device.

13. A remote device for receiving a reformatted web page from a host server, comprising:

computing memory and a coupled processor, the processor operative to;

transmit a uniform resource locator to the host server through a first lens presented within a window of a browser on the remote device, the browser further comprising a second lens within the window of the browser;

receive a web page corresponding to the uniform resource locator displayed in the first lens presented within the window of the browser, the web page comprising display data and specifying a first font size, only a portion of the display data being visible within a first display area of the first lens using the first font size;

transmit a request to reformat the received web page, the request to reformat indicated to fit all of the transmitted display data into the first display area of the first lens; and receive the reformatted web page for display in the first display area of the first lens, all of the display data being viewable within the first display area using a second font size without using a horizontal scroll bar or vertical scroll bar.

14. The remote device of claim 13, wherein the processor is further operative to receive the reformatted web page such that all of the display data is visible within the first display area.

15. The remote device of claim 13, wherein the processor is further operative with the processor to receive the web page reformatted to a percentage of its original size selected in the request.

16. A host server for reformatting a web page presented at a remote device, comprising:
  computing memory and a coupled processor, the processor operative to:
    transmit by the host server a web page corresponding to a received uniform resource locator for display in a first lens presented within a window of a browser on the remote device, the web page comprising display data and specifying a first font size, only a portion of the display data being visible within a first display area of the first lens using the first font size, the browser further comprising a second lens within the window of the browser;
    receive by the host server a request from a user to reformat the transmitted web page, the request to reformat indicating to the host server to fit all of the display data into the first display area of the first lens; and
    in response to the request:
      determine whether the display data has a size greater than or less than the first display area of the first lens;
      reformat the transmitted web page if the size of the display data is greater than or less than the first display area, the reformatting comprising specifying that at least a portion of the display data be displayed using a second font size; and
      transmit by the host server the reformatted web page for display in the first display area of the first lens, all of the display data being viewable within the first display area without using a horizontal scroll bar or vertical scroll bar.

17. The host server of claim 16, wherein the processor is further operative to transmit the reformatted web page such that all of the display data is visible within the first display area.

18. The host server of claim 16, wherein the processor is further operative to transmit the reformatted display data, the display data reformatted to a percentage of its original size selected in the request.

19. A computer readable medium having stored therein computer executable instructions that cause a system to perform a method comprising:
  receiving a uniform resource locator received through a first lens presented within a window of a browser on a remote device, the browser further comprising a second lens within the window of the browser;
  transmitting a web page corresponding to the uniform resource locator for display in the first lens within the window of the browser, the web page comprising display data and specifying a first font size, only a portion of the display data being visible within a first display area of the first lens using the first font size;
  receiving a request from the remote device to reformat the transmitted web page, the request to reformat indicating to a host server to fit all of the display data into the first display area of the first lens; and
  in response to the request:
    reformatting the transmitted web page, the reformatting comprising specifying that at least a portion of the display data be displayed using a second font size; and
    transmitting the reformatted web page for display in the first display area of the first lens, all of the display data being viewable within the first display area without using a horizontal scroll bar or a vertical scroll bar.

20. The computer readable medium of claim 19, wherein reformatting the web page comprises reformatting the web page in response to the request such that all of the display data is visible within the first display area.

21. The computer readable medium of claim 19, wherein reformatting the web page comprises reformatting the display data to a percentage of its original size identified in the request.

22. A computer readable medium having stored thereon computer-executable instructions that cause a system to perform a method comprising:
  transmitting a uniform resource locator to a host server through a first lens presented within a window of a browser on a remote device, the browser further comprising a second lens within the window of the browser;
  receiving a web page corresponding to the uniform resource locator displayed in the first lens presented within the window of the browser, the web page comprising display data and specifying a first font size, only a portion of the display data being visible within a first display area of the first lens using the first font size;
  transmitting a request to reformat the received web page, the request to reformat indicated to fit all of the display data into the first display area of the first lens; and
  in response to the request:
  receiving the reformatted web page for display in the first display area of the first lens, all of the reformatted display data being viewable within the first display area using a second font size without using a horizontal scroll bar or vertical scroll bar.

23. The computer readable medium of claim 22, wherein receiving the reformatted web page comprises receiving the display data such that all of the display data is visible within the first display area.

24. The computer readable medium of claim 22, wherein receiving the reformatted web page in response to the request comprises receiving the display data reformatted to a percentage of its original size identified in the request.

25. A computer readable medium having stored thereon computer-executable instructions that cause a computing device to perform a method comprising:
  transmitting by a host server a web page corresponding to a received uniform resource locator for display in a first lens presented within a window of a browser on a remote device, the web page comprising display data and specifying a first font size, only a portion of the display data being visible within a first display area of the browser using the first font size;
  receiving a request by the host server from the remote device to reformat said transmitted web page, the request to reformat indicating to the host server to fit all of the display data into the first display area of the first lens; and
  in response to the request:
    determining whether the display data has a size greater than or less than the first display area of the first lens;
    reformatting the transmitted web page if the size of the display data is greater than or less than the display area, the reformatting comprising specifying that at least a portion of the display data be displayed using a second font size; and
    transmitting the reformatted web page for display in the first display area of the first lens, all of the display data being viewable within the first display area without using a horizontal scroll bar or vertical scroll bar.

26. The computer readable medium of claim 25, wherein reformatting the web page comprises reformatting the display data such that all of the display data is visible within the first display area.

27. The computer readable medium of claim 25, wherein reformatting the web page comprises reformatting the display data to a percentage of its original size identified in the request.

28. A computer readable medium having stored thereon computer-executable instructions that cause a system to perform a method comprising:
    requesting a host server to transmit a web page for presentation in a first display area of a first lens presented within a window of a browser on said remote device, the browser further comprising a second lens within the window of the browser;
    receiving from the host server the web page, the web page comprising display data and specifying a first font size, only a portion of the display data associated being visible within a first display area of the first lens using the first font size;
    transmitting a request to reformat the received web page, the request to reformat indicating to fit all of the display data into the first display area of the first lens; and
    in response to the request:
        receiving from the host server display data for display in the first display area of the first lens, all of the reformatted display data being viewable within the first display area using a second font size without using a horizontal scroll bar or a vertical scroll bar.

29. The computer readable medium of claim 28, wherein all of the reformatted web page is visible within the first display area.

30. The computer readable medium of claim 28, wherein in the reformatted web page, the display data has been reformatted to a percentage of its original size identified in the request.

31. A method performed by a host server for presenting web content to a remote device, comprising:
    receiving an identifier from the remote device;
    verifying the identifier;
    upon the verification, transmitting display information including at least a first lens and a second lens for presentation within a window of a browser on the remote device;
    receiving a first uniform resource locator through the first lens;
    transmitting a web page corresponding to the first uniform resource locator for display in the first lens, the web page comprising display data and-specifying a first font size, only a portion of the display data being visible within a first display area of the first lens using the first font size;
    receiving a request from the remote device to reformat the transmitted web page, the request to reformat indicating to the host server to fit all of the transmitted display data into the first display area of the first lens; and
    in response to the request:
        reformatting the transmitted web page, the reformatting comprising specifying that at least a portion of the display data be displayed using a second font size; and
        transmitting the reformatted web page for display in the first display area of the first lens, all of the display data being viewable within the first display area without using a horizontal scroll bar or a vertical scroll bar comprised in navigation controls of the first lens.

32. A method, performed by a host server, for reformatting a web page presented at a remote device, comprising:
    electronically transmitting by the host server the web page stored at the host server and corresponding to a received uniform resource locator for display in a first lens presented within a window of a browser on the remote device, the web page comprising display data and specifying a first font size, only a portion of the display data being visible within a first display area of the first lens using the first font size, the browser further comprising a second lens within the window of the browser;
    electronically receiving a request by the host server from the remote device to reformat the transmitted web page, the request to reformat indicating to the host sever to fit all of the display data into the first display area of the first lens; and
    in response to the request:
        electronically reformatting by the host server the transmitted web page, the reformatting comprising specifying that at least a portion of the display data be displayed using a second font size; and
        electronically transmitting by the host server the reformatted web page for display in the first display area of the first lens, all of the reformatted display data being viewable within the first display area without using a horizontal scroll bar or a vertical scroll bar.

33. The method of claim 1, further comprising the first lens directing that the reformatted web page be displayed in the second lens.

* * * * *

UNITED STATES PATENT AND TRADEMARK OFFICE
CERTIFICATE OF CORRECTION

| | | |
|---|---|---|
| PATENT NO. | : 7,890,856 B2 | Page 1 of 1 |
| APPLICATION NO. | : 11/515433 | |
| DATED | : February 15, 2011 | |
| INVENTOR(S) | : Chiang | |

It is certified that error appears in the above-identified patent and that said Letters Patent is hereby corrected as shown below:

Title Page, under "Related U.S. Application Data", in Column 1, Line 3, below Item No. (62) insert -- (60) Provisional application No. 60/187,434, filed on Mar. 7, 2000. --.

Page 2, item (56), under "Other Publications", in Column 2, Line 8, delete "www.mywcbos.com," and insert -- www.mywebos.com, --.

Page 2, item (56), under "Other Publications", in Column 2, Line 10, delete "Cixtrix" and insert -- Citrix --.

Page 2, item (56), under "Other Publications", in Column 2, Line 27, delete "Mar. 20, 2011," and insert -- Mar. 20, 2001, --.

Page 2, item (56), under "Other Publications", in Column 2, Line 50, delete "Action" and insert -- Office Action --.

Page 2, item (56), under "Other Publications", in Column 2, Line 66, delete "Action" and insert -- Action dated --.

Column 15, line 13, in Claim 4, delete "request" and insert -- request: --.

Column 16, line 40, in Claim 13, delete "to;" and insert -- to: --.

Column 17, lines 39-40, in Claim 19, delete "computer executable" and insert -- computer-executable --.

Signed and Sealed this
Seventh Day of June, 2011

David J. Kappos
*Director of the United States Patent and Trademark Office*